United States Patent [19]

Bell

[11] 3,839,678

[45] Oct. 1, 1974

[54] CRYSTAL CONTROLLED ALL-BAND TELEVISION TUNING SYSTEM

[75] Inventor: John F. Bell, Wilmette, Ill.

[73] Assignee: Zenith Radio Corporation, Chicago, Ill.

[22] Filed: Feb. 26, 1973

[21] Appl. No.: 336,107

[52] U.S. Cl. .................. 325/468, 325/419, 325/422, 325/446, 325/453, 325/464, 331/18, 334/14

[51] Int. Cl. ............................................. H04b 1/16

[58] Field of Search ............................ 325/416–421, 325/452, 453, 464, 465, 468, 422, 423, 442, 446, 449; 331/18, 19, 47, 179; 334/14–16

[56] References Cited

UNITED STATES PATENTS 2,790,072 4/1957 Hugenholtz et al. ................ 325/422

OTHER PUBLICATIONS

"Direct Conversion, A Neglected Technique", by Wes Hayward and Dick Bingham, QST, November 1968, pages 15–17, 156.

*Primary Examiner*—Robert L. Griffin
*Assistant Examiner*—Marc E. Bookbinder
*Attorney, Agent, or Firm*—Nicholas A. Camasto; John J. Pederson

[57] ABSTRACT

A continuous tuning system for a television receiver operable over all VHF and UHF broadcast bands and over a cable band of substantial range, in which all channel selection is controlled by a single fixed-frequency precision pulse signal source, preferably derived from a crystal-controlled oscillator. The system comprises a tunable oscillator incorporated in a phase-lock loop that includes a modulator which modulates the tunable oscillator output with a low-duty-cycle pulse signal of precisely controlled frequency to develop a braod spectrum signal with sidebands at intervals corresponding to the pulse frequency. A selector circuit in the loop selects one sideband from the modulator output for application to a phase comparator for comparison with a reference signal, adjustable over a limited span, to offset the tunable oscillator output and compensate for variations of the beating frequencies required for different reception channels from integral multiples of the channel separation frequency. The comparator, in turn, controls the frequency of the tunable oscillator. The reference signal generator is precisely controlled in frequency by the same crystal control circuit as the pulse signal source.

21 Claims, 11 Drawing Figures

CRYSTAL CONTROLLED ALL-BAND TELEVISION TUNING SYSTEM

BACKGROUND OF THE INVENTION

Tuning systems for television receivers present a number of difficult problems, many of which stem from the frequency assignments for television transmission channels. For broadcast transmission, television channels occur in three different VHF groups, comprising channels 2 through 4 as a first group, channels 5 and 6 as a second group, and channels 7 through 13 as a third group. Within these groups there is no consistent relation of the individual channel carrier frequencies to the standard television channel bandwidth of six megahertz. For UHF transmission, there is a single large group of channels, numbers 14 through 83, with carrier frequencies consistently separated by six megahertz. Even in the UHF range, however, the beat frequencies required for demodulation of the individual channels are not integral multiples of six megahertz. Thus, a tuning system for a television receiver capable of operating over all of the VHF and UHF reception bands encounters substantial complications and difficulties because the bands are not contiguous with the frequency spectrum, the beating frequencies for individual channels are not multiples of the channel separation frequency of six megahertz, the variations of the beating frequencies for integral multiples of six megahertz are different for the different reception bands, and the overall frequency range that must be covered for effective reception is quite large, extending from 57 megahertz to 897 megahertz.

Within the VHF spectrum, reasonably satisfactory tuning equipment has been porvided, predominantly with tuners having individual tuning strips for each VHF channel. For the seventy channels in the UHF range, however, a comparable arrangement for a separate tuning element for each channel is both impractical and uneconomical. Despite the current requirement that all broadcast television receivers be equipped for UHF reception, UHF tuners have generally suffered from instability, difficult tuning procedures, and poor tuner performance. In some tuners, these problems have been partially alleviated by the provision of a limited number of preset channels. This solution, however, has been generally inadequate as additional UHF channels have been placed in operation in different locations. Furthermore, for the user who changes locations, preset selection of a few channels in the UHF range may constitute a disadvantage rather than an advantage.

The extent of the inadequacy of available television tuning systems is emphasized by recent demands for equal tuning facility and performance in the UHF band as compared with the VHF band. The use of different tuning procedures for VHF and UHF reception, in presently available systems, is confusing to the ordinary user and often leads the user to ignore the available UHF channels. Recent emphasis on cable transmission systems, adding many additional channels even in areas served by VHF and UHF broadcast transmission, presents the prospect of additional complications even greater than those created by the introduction of UHF transmission.

Successful exploitation of the television services available with a large choice of both VHF and UHF braodcast channels, together with a substantial number of cable channels, requires a totally new tuning system capable of providing convenient and positive selection of all available channels, preferably by operation of a single control element. At the same time, since cable systems are still in an early stage of development, the tuning system should be capable of effective and ecomomic operation for broadcast reception alone, allowing adaptation to cable service without inhibiting the broadcast capabilities of the receiver. The tuning system should provide for use of the same control and tuning procedures on all broadcast and cable channels and preferably should allow for removal of functional adjustments from the control of the user. Finally, an effective all-band television tuning system, broadcast and cable, should afford maximum flexibility in providing for manual, automatic, or remote selection of individual channels.

SUMMARY OF THE INVENTION

It is a principal object of the present invention, therefore, to provide a new and improved continuous tuning system for a television receiver or like communication receiver required to operate over at least two distinct reception bands, each including a plurality of transmission channels, allowing for substantially uniform tuning procedures for all channels in all reception bands.

A further object of the invention is to provide a new an improved continuous tuning system for a television receiver in which selection of individual channels throughout the VHF and UHF reception bands, and within a cable reception band, can be accomplished by adjustment of a single tunable oscillator.

A related feature of the invention is the utilization of a local oscillator for a UHF tuner as the single tunable oscillator controlling operation of the entire tuning system.

Another object of the invention is to provide a new and improved continuous tuning system for a television receiver, operable over all broadcast and cable reception bands, in which all critical frequencies are controlled from a single crystalcontrolled source. Thus, in the tuning system of the invention, all critical modulation signals are derived, directly or indirectly, from a single crystal-controlled source preferably operating at a frequency of 6 MHz.

An additional object of the invention is to provide a new and improved continuous tuning system for a television receiver, operable over all broadcast and cable reception bands, that includes provision for effective compensation for misaligned IF stages without requiring separate adjustment when the receiver is switched from one reception band to another.

An important object of the invention is to provide a new and improved continuous tuning system for an all-band television receiver that is readily and effectively adaptable to manual operation and that is equally suitable for automated or remote control.

A specific object of the invention is to provide a new and improved continuous tuning system for an all-band television receiver that is reasonable in cost and that is stable and effective in operation.

Accordingly, the invention is directed to a continuous tuning system for a television receiver or like communication receiver operable over at least two distinct reception bands each including a plurality of transmission channels displaced from each other by a given channel separation frequency. The system comprises pulse signal generator means for generating a pulse signal of precisely controlled standard frequency harmonically related to the channel separation frequency and a signalcontrolled oscillator, tunable over a broad frequency range, for generating a demodulation signal for control of demodulation of received signals. A modulator is coupled to the oscillator and to the pulse signal generator, and modulates the demodulation signal with the pulse signal to develop a broad spectrum signal including multiple sidebands of the demodulation signal spaced from the demodulation signal by integral multiples of the standard frequency. The system further comprises selector means, coupled to the modulator, for deriving one selected sideband signal, within a given frequency span, for the broad spectrum signal, and reference signal generator means for generating a reference signal of predetermined precisely controlled frequency within the given frequency span. A phase comparator, coupled to the reference signal generator means and to the selector means, develops an error signal representative of variations in frequency and phase between the selected sideband signal and the reference signal; the error signal is applied to the oscillator to complete a phase-locked loop and lock the demodulation signal on a fixed frequency.

DESCRIPTION OF THE PREFERRED EMBODIMENTS

Figure 1:
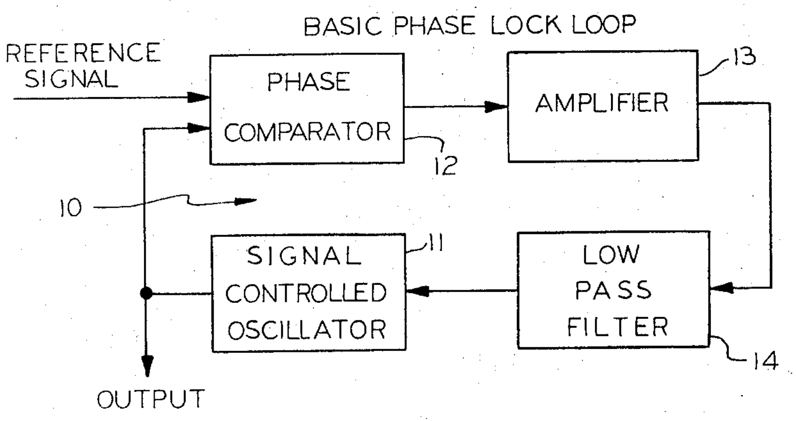
FIG. 1 is a block diagram of a basic phase-locked loop employed, in several forms, in the tuning systems of the present invention.

FIG. 1 illustrates a basic phase-lock loop circuit 10 that is utilized, with numerous changes and modifications, in the continuous television receiver tuning systems of the invention. The phase-lock loop 10 comprises a signal-controlled oscillator 11. The particular construction selected for oscillator 11 is not critical; it may comprise any of a variety of known oscillator configurations that can be adjusted in frequency in response to an applied control signal. Usually, the control signal is a DC signal. Specifically, oscillator 11 may comprise a conventional oscillator circuit that incorporates a voltage-adjustable impedance such as a varactor.

The output of oscillator 11 is connected to one input of a phase comparator circuit 12. Phase comparator 12 has a second input connected to a reference signal source to which oscillator 11 is to be matched in phase and frequency. The output of comparator 12 is connected to the input of an amplifier 13 which is in turn coupled to a low pass filter 14. The output of filter 14 is coupled ot oscillator 11; more specifically, the output of filter 14 is coupled to the signal-controlled variable impedance in oscillator 11.

The operation of phase-lock loop 10 (FIG. 1) is generally well known and requires only a brief description. In comparator 12, the output signal from oscillator 11 is compared with a reference signal applied to the comparator from an external source. Whenever there is any variation in frequency or phase between the two signals supplied to comparator 12, the output signal from apmplifier 13 consists of asymmetrical cycles at the difference frequency. The resultant lack of symmetry in the output of amplifier 13 reflects the presence of a DC component which is employed as an error signal and is applied to the signal-control element of oscillator 11 through low pass filter 14. The action in loop 10 is cumulative and results in the locking of oscillator 11 to the reference signal supplied to comparator 12, in both phase and frequency; a frequency lock is usually achieved in approximately fifteen or twenty cycles.

In a phase-lock loop such as loop 10, FIG. 1, the difference between the output frequency of oscillator 11 and the frequency of the reference signal supplied to comparator 12 may be large enough so that no output is supplied to the control element of oscillator 11 through filter 14. Under these circumstances, no frequency lock is achieved. Thus, the pull-in range of loop 10 is limited by the response of the low pass filter 14. The hold-in characteristic of loop 10, on the other hand, is determined by the loop gain, taken as the product of the comparator constant, the oscillator constant, and the gain of the amplifier. Both the pull-in and hold-in characteristics of loop 10 can be limited by limiting the output of amplifier 13. That is, pull-in and hold-in can be made approximately equal and constant is the sensitivity of the signal-controlled oscillator 11 is made relatively constant and the input to the oscillator is held within a constant pair of limits. This relationship is not particularly critical if the phase-lock loop is held inactive until the selected frequency is reached and then turned on fast enough to establish control while within pull-in range.

Figure 2:
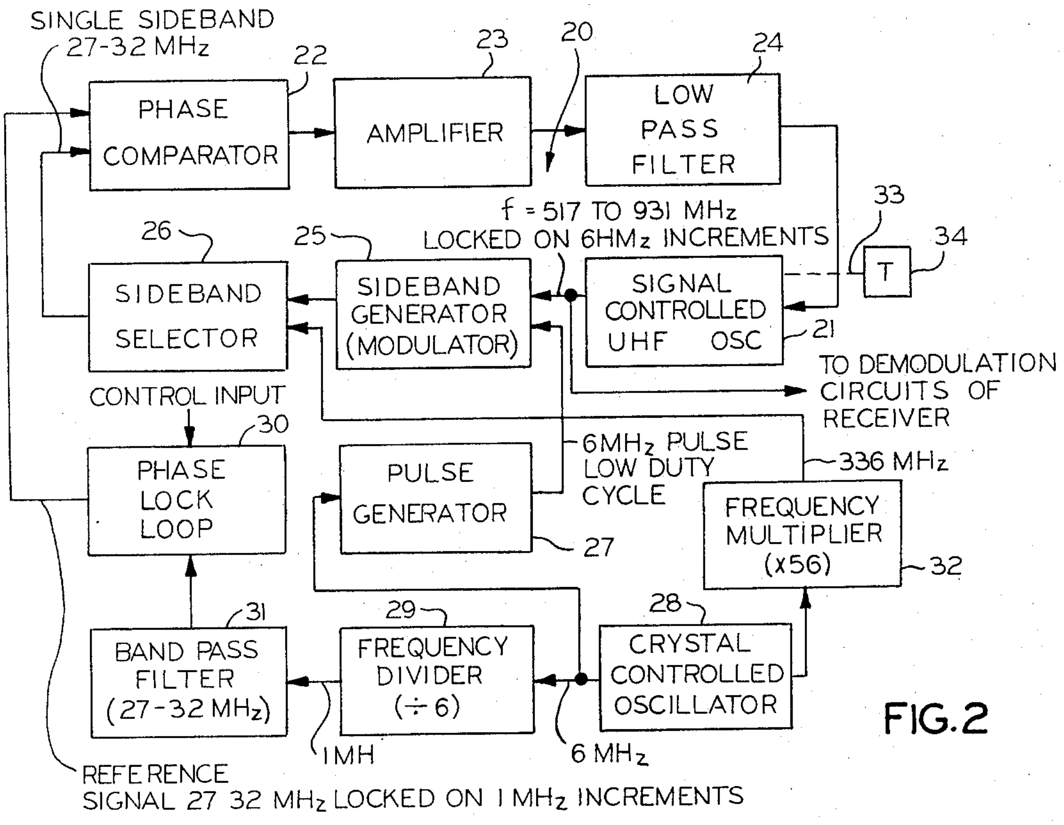
FIG. 2 is a simplified block diagram of the principal components of a continuous all-band television tuning system constructed in accordance with one embodiment of the present invention.

FIG. 2 illustrates a phase-lock loop 20 that is basically similar in most respects to loop 10 (FIG. 1) but has been modified to afford a basis for continuous tuning of a UHF oscillator 21 for channel selection in a television receiver. The phase-lock loop 20 of FIG. 2 includes a phase comparator 22 having its output connected to an amplifier 23, which is in turn connected to a low pass filter 24. The output of filter 24 is applied to a signal-controlled variable tuning impedance, such as a varactor, in oscillator 21. Oscillator 21 should have an operating range of at least 500 to 950 MHz.

In phase-lock loop 20, however, two additional circuits are incorporated in the loop between oscillator 21 and phase comparator 22. These two circuits comprise a sideband generator or modulator 25, and a sideband detector or selector 26. Modulator 25 has two inputs, one of which is connected to the output of oscillator 21. The output of modulator 25 is connected to one of the two inputs for phase comparator 22.

The incorporation of modulator 25 and selector 26 in phase-lock loop 20 (FIG. 2) is occasioned by the necessity to compensate for the offset of the required oscillation frequencies, in the mixer stage of a television receiver, from integral multiples of the standard channel separation frequency of 6 MHz. Table I sets forth the required beating frequencies, for use with a standard intermediate frequency of forty-four megahertz, for the various VHF and UHF television broadcast transmission channels. As is apparent from Table I, none of these beat frequencies is a harmonic of the six megahertz standard channel separation frequency. Table I also lists, for each channel, the nearest harmonic of the standard channel separation frequency of 6 MHz, relative to the required beat frequency, the required offset, and a reference frequency based on a frequency of 30 MHz for zero offset. The selection of a 30 MHz frequency for zero offset is arbitrary; another harmonic of 6 MHz can be employed if desired.

30 preferably comprises a conventional commercial integrated circuit constructed specifically to operate as a phase-lock loop, such as a Signetics model 526 B. This device is tuned by adjustment of an external capacitance or by adjustment of the amplitude of a current applied to one terminal of the integrated circuit. Thus, loop 30 can be adjusted, by an external control, to any integral multiple of one megahertz within the range of 27 to 32 MHz. The output of phase-lock loop 30 is connected to the reference signal input of phase comparator 22 in loop 20.

The precision 6 MHz output signal from oscillator 28 is also applied to a frequency multiplier 32. Multiplier 32 is employed to develop a demodulation signal for actuation of the sideband selector 26 in the main phase-lock loop 20. In the illustrated construction, selector 26 may comprise a double super-heterodyne circuit of the kind described more fully hereinafter in conjunction with FIG. 7; for this type of selector, multiplier 32 may have a multiplication factor of fifty-six affording an output signal of 336 MHz that is coupled to the second input of selector 26.

In addition to the varactor or other signal-controlled tuning impedance in oscillator 21, the oscillator is provided with external tuning means to afford a basis for channel selection. In FIG. 2, the tuning means is illustrated as a tuning shaft 33 connected to a tuning control 34 which may comprise a manual adjustment knob. It should be recognized that tuning control 34 may also comprise a drive motor or other actuating means connected to an automatic selector system for channel selection to allow for remote or other automatic control of a television receiver in which the system of FIG. 2 is incorporated.

TABLE I

| BAND | CHANNEL NUMBER | BEAT FREQUENCY (FOR 44 MHz I. F.) | NEAREST HARMONIC OF 6 MHz | OFFSET | REFERENCE FREQUENCY (30 MHz = ZERO OFFSET) |
|---|---|---|---|---|---|
| LOW | 2 | 101 MHz | 102 MHz | −1 MHz | 29 MHz |
| | 3 | 107 | 108 | −1 | 29 |
| VHF | 4 | 113 | 114 | −1 | 29 |
| MIDDLE | 5 | 123 | 126 | −3 | 27 |
| VHF | 6 | 129 | 132 | −3 | 27 |
| HIGH | 7 | 221 | 222 | −1 | 29 |
| VHF | 8–12 | — | — | −1 | 29 |
| | 13 | 257 | 258 | −1 | 29 |
| | 14 | 517 | 516 | +1 | 31 |
| UHF | 15–82 | — | — | +1 | 31 |
| | 83 | 931 | 930 | +1 | 31 |
| CABLE | ? | 54–300 ? | Unknown | Unknown | Unknown |

In addition to the basic phase-lock loop 20, FIG. 2 illustrates one circuit arrangement that may be employed to generate the offsets delineated in Table I. The offset signal generation circuits, in the construction illustrated in FIG. 2, include a pulse signal generator 27 which generates a pulse signal of precisely controlled standard frequency equal to the channel separation frequency of 6 MHz. The output of pulse generator 27 is applied to modulator 25. Precision control of the frequency of pulse generator 27 is attained by actuation of the pulse generator from a crystal-controlled oscillator 28.

The output of oscillator 28 is also connected to a frequency divider 29, having a division factor of six, that develops a pulse signal including a wide range of harmonics. The output of frequency divider 29 is coupled to a bandpass filter 31 having a passband of 27 to 32 MHz. The output of filter 31, in turn, is applied as a reference signal to a phase-lock loop 30 which may correspond in construction to the loop 10 of FIG. 1. Loop As is apparent from Table I, the output signal from the signal-controlled UHF oscillator 21 (FIG. 2) may be utilized directly as a demodulation signal for the entire UHF reception band, provided the oscillator signal can be adjusted over a range of 517 to 931 MHz and successfully locked on 6 MHz increments within that range. Furthermore, the demodulation signal from oscillator 21 can also be utilized to control demodulation within the VHF reception band and within a cable reception band, as described hereinafter in connection with FIGS. 3 through 9. However, the operating frequency of oscillator 21 is so high that it presents substantial difficulties in the generation of the lower frequencies required for VHF and cable reception in a direct count-down or frequency division operation. Moreover, the high frequency of the output from oscillator 21 poses difficult technical problems if the oscillator is incoporated in a phase-lock loop operating at the oscillator frequency. Thus, to tune oscillator 21 over the necessary range of 414 MHz (517 to 931 MHz) in a direct beating process would require handling frequencies over an almost impossibly wide range from zero to over 200 MHz.

These difficulties are overcome by incorporating sideband modulator 25 and selector 26 in loop 20, together with the illustrated circuits for controlling the modulator and the selector. In modulator 25, the demodulation signal from UHF oscillator 21 is modulated with a low-duty-cycle 6 MHz pulse signal from pulse generator 27. The signal from generator 27 is precisely controlled in frequency by the input signal supplied to the pulse generator from the 6 MHz crystal-controlled oscillator 28. The output signal from modulator 25 is a broad spectrum signal that includes a multiplicity of sidebands of the demodulation signal from oscillator 21, recurring at integral multiples of the pulse signal frequency. That is, the output signal from sideband generator 25 comprises a uniform "comb" of sideband components of approximately equal amplitude, spaced at 6 MHz intervals on each side of the output frequency of oscillator 21 (see FIG. 6).

As oscillator 21 is tuned by tuning control 34, the sideband components in the broad spectrum signal developed by modulator 25 move continuously past the center frequency of the oscillator range of 517 to 931 MHz. Thus, a relatively simple fixed tuned receiver, employed as the sideband selector 26, can amplify each sideband component in turn and heterodyne that component to a frequency near the 30 MHz offset reference frequency (Table I). That is, selector 26 affords an output signal that comprises just one sideband derived from the broad spectrum output signal of modulator 25, in this instance having a range of approximately 27 to 32 MHz.

For effective operation of loop 20, reference signal generator means must be provided for generating a reference signal of predetermined precisely controlled frequency within the same frequency span, 27 to 32 MHz, as the one sideband that is selected by sideband detector 26. In FIG. 2, this reference signal generator means comprises frequency divider 29, bandpass filter 31, and phase-lock loop 30.

Frequency divider 29 develops a one MHz output signal locked in frequency to the 6 MHz signal from the crystal-controlled oscillator 28. Thus, oscillator 28 constitutes a precision frequency determination means that controls the frequency of both pulse generator 27 and the reference signal generator means 29–31. The pulse output signal from frequency divider 29 includes a high harmonic content. That signal is supplied to filter 31, which develops an output signal that includes the twenty-seventh through the thirty-second harmonics of the one MHz input. That is, filter 31 passes the harmonic components of the one MHz input signal occuring between 27 and 32 MHz.

Phase-lock loop 30 (FIG. 2), corresponding in construction and operation to the basic phase-lock loop 10 illustrated in FIG. 1, locks onto a frequency constituting an integral multiple of one MHz, within tge range of 27 to 32 MHz, when the signal-controlled oscillator included in loop 30 is tuned near one of these frequencies by the external control input. As noted above, tuning of loop 30 can be accomplished either by changing an external capacitance or by changing a current to one terminal of the phase-lock loop. This permits a change in the offset reference frequency (Table I) to be accomplished in the course of switching of UHF, VHF and cable tuners as described more fully hereinafter in conjunction with FIG. 3.

In phase comparator 22, the one selected sideband signal from selector 26 is compared in phase and frequency with the reference signal from loop 30. The output signal from comparator 22 is amplified in amplifier 23, and the DC component of that signal passes through filter 24 and is applied to oscillator 21 to lock the UHF oscillator on a single frequency. With the proper offset reference frequency from loop 30, therefore, phase-lock loop 20 can lock oscillator 21 is tuned through its range of 517 to 931 MHz.

Figure 3:
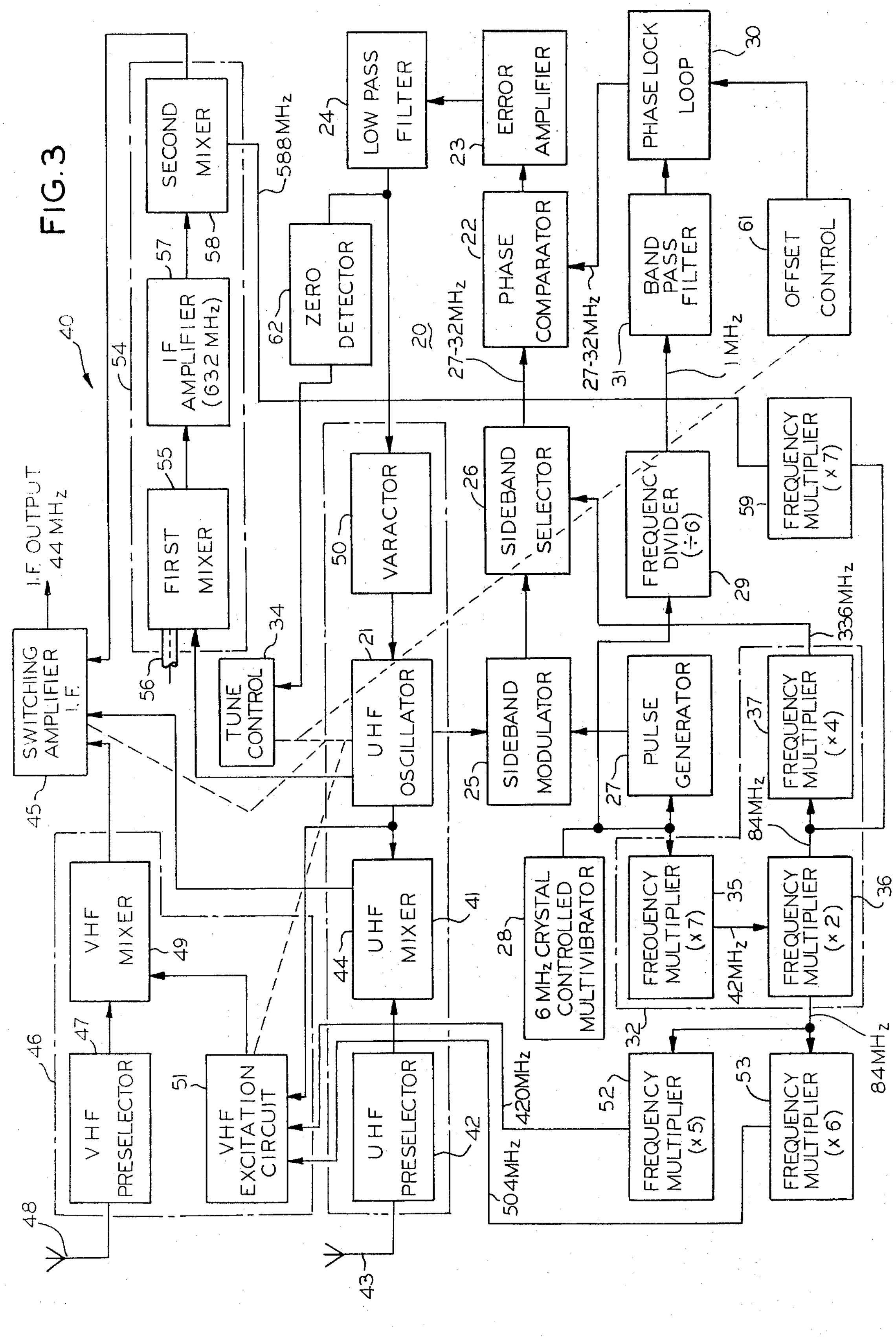
FIG. 3 is a block diagram of one embodiment of a continuous television tuning system constructed in accordance with the present invention, utilizing the basic loop illustrated in FIG. 2.

FIG. 3 illustrates the basic tuning apparatus of FIG. 2, including the main phase-lock loop 20, incorporated in a complete continuous all-band television tuning system 40 constructed in accordance with one embodiment of the present invention. In system 40, the varactor 50 that is utilized for adjustment of the operating frequency of UHF oscillator 21 is shown separately from the oscillator. The frequency multiplier 32 is shown as three successive stages 35, 36 and 37 having multiplication factors of seven, two, and four, respectively, to afford a total multiplication factor of fifty-six and develop the 336 MHz signal to be supplied to sideband selector 26. Otherwise, the circuit components from FIG. 2 are repeated in FIG. 3 without change.

In tuning system 40, oscillator 21 is incorporated in a UHF tuner 41 comprising a preselector circuit 42 having an input connected to a UHF antenna 43. The output of preselector 42, which may be conventional in construction, is coupled to a UHF mixer 44. MIxer 44 has a second input connected to the output of oscillator 21. The output of mixer 44 is coupled to one input of a switching IF amplifier 45.

Tuning system 40 further comprises a VHF tuner 46. Tuner 46 includes the conventional preselection and input stages, illustrated as a VHF preselector circuit 47, having an input connected to a VHF antenna 48. The output of preselector 47 is connected to a mixer stage 49. Tuner 46 further comprises a VHF excitation circuit 51 including two mixers, the outputs of both mixers being connected to a second input to the mixer 49. One input to the VHF excitation circuit 51 is derived from the output of oscillator 21 in loop 20. Another input to excitation circuit 51 is coupled to the output of a frequency multiplier 52 having a multiplication factor of five. A third input to the VHF excitation circuit unit 51 is derived from a frequency multiplier 53 having a multiplication factor of six. The inputs to the two frequency multipliers 52 and 53 are each connected to the 84 MHz output of the intermediate multiplier stage 36 in multiplier unit 32.

A cable tuner 54 is also incorporated in tuning system 40 (FIG. 3). For purposes of illustration, it is assumed that tuner 54 is required to function with television signals received over a cable 56 within a cable reception band of 54 MHz to 300 MHz affording individual channels 84 through 123, separated by 6 MHz intervals. In tuner 54, the cable input connection 56 is connected to a first mixer stage 55, which has a second input derived from the output of oscillator 21. The output of mixer 55 is coupled to the input of an intermediate frequency amplifier 57 for which an IF frequency of 632 MHz has been selected. The output of amplifier 57 is coupled to a second mixer 58. Mixer 58 has a second input derived from the output of a frequency multiplier 59; the multiplier factor for circuit 59 is seven and the input to the multiplier is derived from the output of the intermediate stage 36 in frequency multiplier 32. The output of the second mixer stage 58 in tuner 54 is connected to a third input for the switching intermediate frequency stage 45.

In tuning system 40, the main tuning member for the UHF oscillator 21, shaft 33, is employed to control a number of switching functions. Thus, shaft 33 is connected to the IF amplifier 45 to switch that circuit between the three different inputs from mixer 44, mixer 49, and mixer 58. The main tuning shaft 33 is also connected to the VHF excitation circuit 51 to switch that circuit between the two inputs from frequency multipliers 52 and 53. A further connection is provided from shaft 33 to an offset control unit 61 which, in the system of FIG. 3, is employed to afford the requiste control input to phase-lock loop 30. It should be understood that although a mechanical connection is indicated from shaft 33 to each of the switched circuits 45, 51 and 61, electrical connections may be utilized in an appropriate system. Furthermore, though a rotatable shaft is convenient and effective, other forms of tuning means can be substituted for shaft 33 and control 34.

Tuning system 40 further comprises a zero detector 62 having an input connected to the output of the low pass filter 24 in the main phase-lock loop 20. Detector 62 may be coupled to tuning control 34 to signal a locked-in condition for loop 20 and thus enable the tuning control to interrupt actuation of tuning member 33 with system 40 accurately tuned to a given reception channel. Thus, the output of detector 62 can be used to actuate a DC motor, or a two-phase AC motor, employed as tuning control 34, to return the main phase-lock loop 20 to a condition of zero error.

In the operation of tuning system 40, the output of UHF oscillator 21, which is controlled as described above in connection with FIG. 2, is supplied directly to a mixer 44 in the UHF tuner 41. Shaft 33 and tuning control 34 are arranged to tune oscillator 21 across its complete range of at least 517 MHz to 931 MHz in the course of 180° of rotation of shaft 33, providing for tuning of the oscillator across the entire required beat frequency range set forth in Table II.

TABLE II

| BAND | CHANNEL NUMBER | BEAT FREQUENCY | SECONDARY BEAT FREQUENCY | OSCILLATOR FREQUENCY |
|---|---|---|---|---|
| | 2 | 101 MHz | 504 MHz | 605 MHz |
| LOW | 3 | 107 | 504 | 611 |
| VHF | 4 | 113 | 504 | 617 |
| MIDDLE | 5 | 123 | 504 | 627 |
| VHF | 6 | 129 | 504 | 633 |
| | 7 | 221 | 420 | 641 |
| HIGH | 8–12 | 227–251 | 420 | 647–671 |
| VHF | 13 | 257 | 420 | 677 |
| | 84 | 686 | 588 | 686 |
| CABLE* | 85–122 | 692–926 | 588 | 692–926 |
| | 123 | 932 | 588 | 932 |
| | 14 | 517 | — | 517 |
| UHF | 15–82 | 523–925 | — | 523–925 |
| | 83 | 931 | — | 931 |

*CABLE channels assumed at frequencies of 54 MHz for Channel 84 to 300 MHz for Channel 123; offset is +2.

For this first half-revolution of main tuning shaft 33, the switching IF amplifier 45 is connected only to the input from UHF mixer 44, the inputs from mixer 49 and mixer 58 being effectively disconnected. For UHF reception, the power supplies for VHF tuner 46 and cable tuner 54 should also be disconnected; this can be readily accomplished by suitable switching apparatus (not shown) actuated from shaft 33.

As tuning system 40 is tuned across the UHF band, as described above, the error signal output from low pass filter 24 approaches zero each time the main phase-lock loop 20 approaches the beat frequency required for one of the UHF reception channels. This condition can be detected by detector 62 to develop a lockedcondition signal for application to tuning control 34, interrupting the tuning operation at the position for proper tuning for each UHF channel and thus affording a mode of operation for tuning system 40 similar to a preset tuner. Detector 62 is particularly useful in automated control systems, such as those in which tuning control 34 may comprise a small drive motor for the main tuning shaft 33, controlled from the phase comparator output and the channel selector means.

Operation of tuning system 40 for the VHF and cable reception bands utilizes the remaining 180° of rotation for the main tuning shaft 33. As shown in Table II, the lowest VHF channel, channel two, requires a beat frequency signal for mixer 49 of 101 MHz. This signal is generated by actuating UHF oscillator 21, in the second half-revolution of its main tuning shaft 33, to an operating frequency of 605 MHz. For this position of tuning shaft 33, the VHF excitation circuit 51 is also switched to receive the 504 MHz signal supplied to the excitation circuit from frequency multiplier 53. In excitation circuit 51, therefore, the 605 MHz signal from oscillator 21 is heterodyned with the 504 MHz signal from frequency multiplier 53 to develop the required 101 MHz beat frequency signal that is supplied to VHF mixer 49 for detection of a channel two signal. Of course, with the main tuning shaft 33 in this position, the power supplied to the UHF tuner 41 and cable tuner 54 should be cut off. However, the UHF oscillator 21 must operate, and signals must be inhibited from entering the IF stages through the UHF tuner.

For VHF channels three through six, tuning system 40 continues to use the 504 MHz output of frequency multiplier 53 as a secondary beat signal supplied to excitation circuit 51 in VHF tuner 46 to generate the appropriate input signal for VHF mixer 49, as shown in Table II. For reception on channel seven, in the high VHF range, however, the continued rotation of the main tuning shaft 33 through its second half-revolution switches excitation circuit 51 to receive a secondary beat signal from frequency multiplier 52 instead of frequency multiplier 53. Thus, for channel seven reception, oscillator 21 is adjusted to an operating frequency of 641 MHz and the oscillator signal is heterodyned with the 420 MHz signal from multiplier 52 to develop the input signal of 221 MHz required by mixer 49 for reception on this channel. This mode of operation is maintained through the highest of the high VHF channels, channel thirteen, for which the frequency of oscillator 21 is maintained at 677 MHz and affords a beat frequency to mixer 49, from excitation circuit 51, of 257 MHz.

Continued rotation of shaft 33, still within its second half-revolution, adjusts tuning system 40 for operation in the cable reception band. As noted above, cable reception is assumed to cover a band of frequencies of from 54 MHz to 300 MHz, arbitrarily designated as channels 84 through 123. For reception over this band, the power supplies for UHF tuner 41 and VHF tuner 46 are disconnected and the circuits of cable tuner 54 are energized; as before, however, the UHF oscillator 21 must operate.

For cable reception, the requirements are substantially different that for VHF and UHF broadcast reception. The signal levels on the separate cable input 56 are such that the input level is known and tuner 54 can be designed for effective operation within relatively close limits. If tuner 54 is constructed for effective operation with ten millivolt signals without producing perceptible intermodulation interference and with no preselection, then the only variable tuning required is the adjustment of UHF oscillator 21. Thus, input preselection may consist of a 54–300 MHz passive filter in the input of the first mixer stage 55.

In cable tuner 54, to minimize intermodulation products, the frequency of the first IF stage 57 is set at more than twice the highest frequency to be received, in this instance 300 MHz. This eliminates all second order products. The 632 MHz operating frequency selected for IF stage 57 also works well in the overall tuning system 40 because, as shown in Table II, the cable band starts only 12 MHz above the point at which the high VHF band ends. Furthermore, this particular initial IF frequency allows operation of the second mixer 58 with a secondary beat frequency input of 588 MHz, derived from frequency multiplier 59, a direct harmonic of the basic 6 MHz signal from oscillator 28. Furthermore, the 588 MHz secondary beat frequency and the range of UHF oscillator frequencies required for the postulated cable band are far removed from the frequencies of the cable band as received on cable 56. It may be noted that the highest frequency for oscillator 21 required for cable reception is 932 MHz (see Table II), corresponding almost exactly to the highest frequency of 931 MHz entailed in UHF operation.

In the construction of tuning system 40, UHF tuner 41 can be designed so that cable tuner 54 constitutes an optional package that may be attached directly to the UHF tuner, either in the initial installation or at a subsequent time. As noted above, UHF oscillator 21 drives the first mixer 55 in cable tuner 54 directly. A tuning dial associated with the main tuning shaft 33 can be calibrated for UHF, VHF and CATV channels; this does not add to the cost of broadcast-only receivers, but allows ready conversion of such receivers for reception of cable channels by addition of an optional tuner 54 either at the time of manufacture or subsequently. Addition of cable tuner 54 requires no additional controls and entails no mutilation or changes in the front panel of the television receiver. As described above, changes from one reception means actuated from the main tuner shaft 33; switching apparatus independent of shaft 33 may be utilized for the transition from one band to another if desired.

Control system 40 must have a precise reference frequency from which the sideband spacing in the broad spectrum signal developed by modulator 25 and the various heterodyning frequencies developed by the system are derived. The economy and accuracy of an oscillator controlled by a quartz crystal is unmatched for this purpose. Crystal-controlled oscillator 28 may be a conventional oscillator circuit or may comprise a multivibrator or sawtooth generator; the term "oscillator" as used in this specification and in the appended claims is intended to encompass any of a variety of circuits of this general kind that are subject to precision frequency control by means of a crystal.

Figure 4:
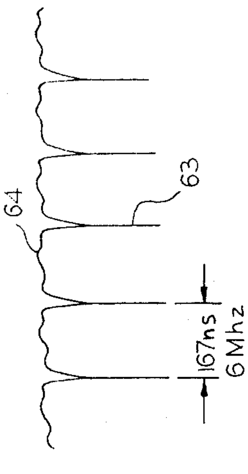
FIG. 4 illustrates the waveform of the output signal for a pulse generator incorporated in the tuning system of FIG. 3.

To obtain uniform amplitude for all of the harmonics in the broad spectrum signal from modulator 25 requires careful control of the shape of the pulse supplied to modulator 25 from pulse generator 27. This is particularly true because the harmonic amplitude must be maintained relatively uniform over a range exceeding 517 to 932 MHz, a range entailing sidebands in a range of approximately 230 to 250 MHz above and below a mean oscillator frequency of about 720 MHz. The requisite uniform spectrum is obtained by developing, in pulse generator 27, a pulse signal of very low duty cycle; typically, the pulse signal 63 from generator 27 has a pulse width of approximately three nanoseconds with a period of 167 nanoseconds as shown in FIG. 4. Furthermore, a controlled amount of ringing is introduced following the pulse by peaking the output of modulator 25 at about 230 to 250 MHz. The pulse waveform illustrated in FIG. 4 is the output waveform of oscillator 28 before peaking and with the return pulse minimized by utilization of a slow time constant on the return to the reference voltage and a fast time constant on the discharge to ground in a circuit of the kind described more fully in connection with FIG. 8. The remaining positive pulse is clipped, preferably using a hot carrier diode clipper. Even at 6 MHz, however, the clipper may do a somewhat less than perfect job of clipping.

Figure 5:
FIG. 5 illustrates the waveform for the output signal from a modulator incorporated in the tuning system of FIG. 3.
Figure 6:
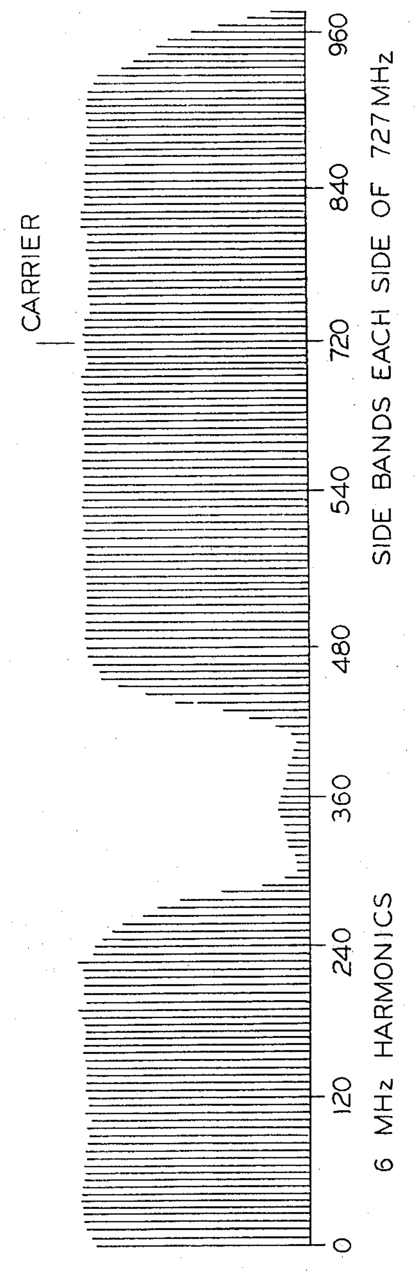
FIG. 6 is a graphic chart of the frequency spectrum for the modulator output signal.

The basic waveform for the output signal from modulator 25 is shown in FIG. 5 and the frequency spectrum for that broad spectrum signal is illustrated in FIG. 6. The vestigial positive pulse 64 in the pulse input signal 63 to the modulator (FIG. 4) may cause the odd and even harmonics to have slightly different amplitudes. Elimination of the mid-period vestigial pulse 64 from pulse 63 would make all sideband components equal, out to the cutoff frequency in the frequency spectrum of FIG. 6. The use of a sawtooth generator with a fast discharge time, as oscillator 28, could be employed for this purpose.

Figure 8:
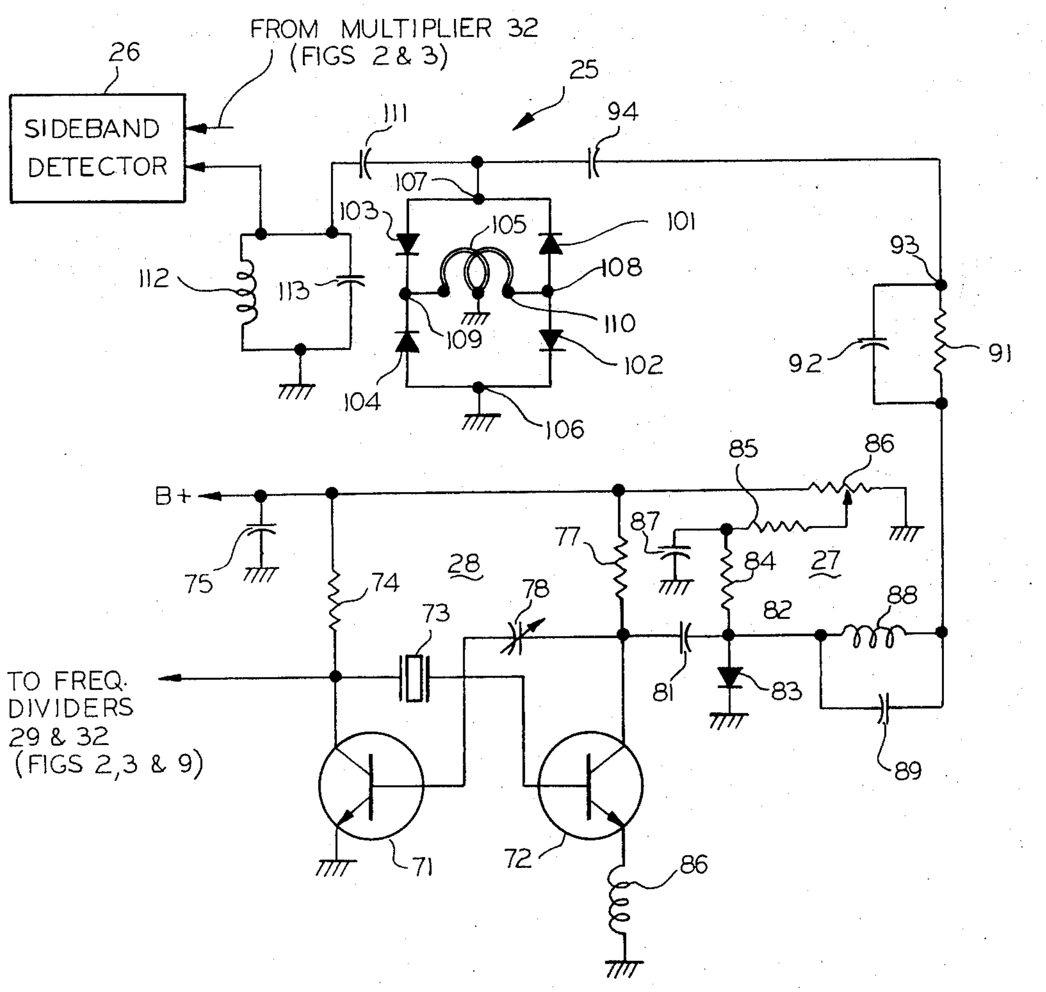
FIG. 8 is a schematic diagram of circuits for the pulse generator and modulator in the tuning system of FIG. 3.

FIG. 8 illustrates suitable circuits for the crystal-controlled multivibrator 28, pulse generator 27, and modulator 25. In the construction shown in FIG. 8, the crystal-controlled multivibrator 28 comprises two transistors 71 and 72. The emitter of transistor 71 is connected to system ground and the collector is connected to one side of 6 MHz control crystal 73, the other side of crystal 73 being connected to the base of transistor 72. The collector of transistor 71 is also connected to a transistor 74 that is in turn connected to a power supply designated as B+. A capacitor 75 is connected from the B+ line to system ground.

The emitter of transistor 72 is connected to a coil 76 that is returned to system ground. The collector of transistor 72 is connected to a resistor 77 that is returned to the B+ supply. The collector of transistor 72 is also connected to an adjustable capacitor 78 that is connected to the base of transistor 71.

In the construction illustrated in FIG. 8, the internal terminal 82 of pulse generator 27 is coupled to the collector of transistor 72 through a coupling capacitor 81. Terminal 82 is also connected to a clipper diode 83 that is returned to system ground, and to a resistor 84 that is connected through a resistor 85 to the tap on a potentiometer 86. The resistance of potentiometer 86 is connected from the B+ supply to system ground. The common terminal of resistors 84 and 85 is connected to a capacitor 87 that is returned to ground.

Terminal 82 in pulse generator 27 is also connected to the parallel combination of an inductance 88 and a capacitor 89. The other side of the tuned circuit 88, 89 is connected to a parallel RC circuit comprising a resistor 91 and a capacitor 92. The output terminal 93 of pulse generator 27 is connected to the input of modulator 25 through a coupling capacitor 94.

Modulator 25, in the form illustrated in FIG. 8, constitutes a double balanced bridge hot carrier diode modulator. The modulator includes four diodes 101, 102, 103 and 104 connected in a bridge configuration between two terminals 106 and 107. A loop inductance 105 comprising a bifilar center-tapped winding is connected across the center terminals 108 and 109 of the bridge and is magnetically coupled to oscillator 21 by means not shown. The center tap of loop 105 is connected to system ground to balance out the carrier at the output of the modulator.

Bridge terminal 106 is grounded. The output of the bridge in modulator 25 is taken from terminal 107, through a coupling capacitor 111. Capacitor 111 is connected to a parallel resonant circuit comprising a coil 112 connected in parallel with capacitor 113 and returned to system ground. This circuit is tuned to 702 MHz. Capacitor 111 is also connected to the input of sideband detector 26.

To avoid modulation of oscillator 21 through a feedback signal from modulator 25, which could feed sideband energy directly into the signal circuits of the television receiver through oscillator 21 and UHF mixer 44, it is desirabe to apply the pulse signal from pulse generator 27 to modulator 25 at a very low level. In addition, it is necessary to avoid re-generating the 6 MHz harmonics in modulator 25, because these cannot be filtered from the output of the modulator without also notching the sidebands that are to be utilized through selector 26.

Figure 7:
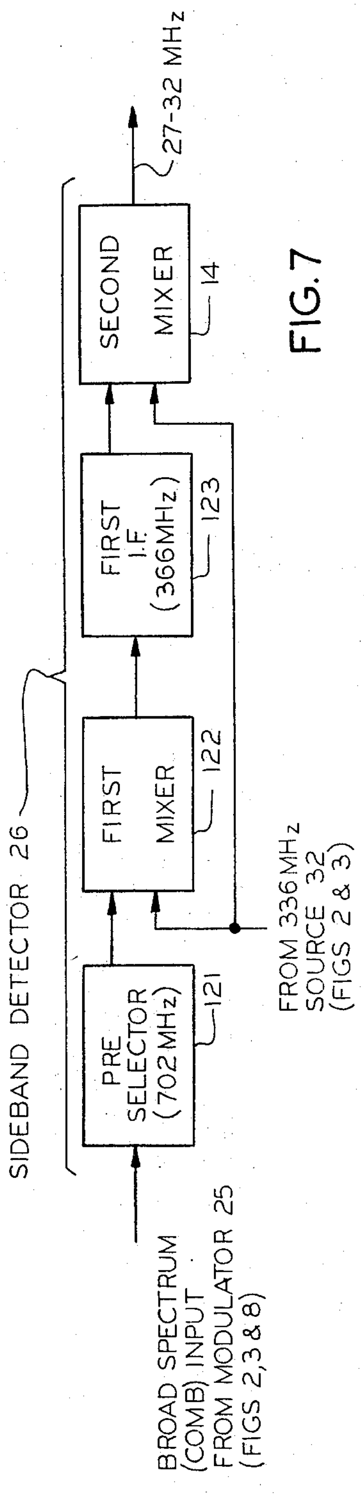
FIG. 7 is a block diagram of one form of sideband selector for the tuning system of FIG. 3.

By driving modulator 25 at a high level through the inductive coupling from loop 110 to the balanced loop 105, and by using a low pulse input level, it is possible to notch the harmonics very effectively in the input at a carrier frequency of approximately 702 MHz. This carrier frequency is selected for convenience in relation to the operation of the double superheterodyne detector circuit for selector 26 that is shown in FIG. 7; a carrier closer to the center of the UHF oscillator range can be utilized with other selector circuits such as that of FIG. 10. Because the pulse input is so low, the modulator input impedance presented to the oscillator does not change during the pulse cycle and the oscillator energy fed to the UHF mixer is not modulated. Even on fringe area reception, this arrangement allows effective operation without perceptible interference.

For one channel in the center of the UHF range, control 40 is required to lock onto the channel carrier. For this channel, the carrier amplitude must be balanced out until it is near the sideband level and then trimmed to the exact level through a circuit bypassing modulator 25. The modification may entail a fixed circuit bypassing the modulator carrier energy equal to the sideband energy when the oscillator is tuned to a frequency equal to the input of the sideband detector. The carrier amplitude need not and will not remain constant at other frequencies.

The hot carrier diodes 101–104 employed in modulator 25 are quite uniform and initial balance is good even at UHF frequencies and at the very low modulation levels employed in system 40. The unbalanced carrier output of modulator 25 changes as the frequency of the input from UHF oscillator 21 is varied. However, since sideband selector 26 is a fixed tuned detector operating at only a single carrier frequency, in this instance 702 MHz, it is necessary to achieve balance at only one frequency.

In the construction of FIG. 8, modulator 25 presents to the pulse source (multivibrator 28 and pulse generator 27) a switch which opens and closes at the frequency (6 MHz) of the crystal-controlled oscillator 28. The sideband energy appearing in the output from modulator 25 comes entirely from pulse generator 27. However, since eighty to over one-hundred fifty switching cycles occur during each pulse period, pulse energy is stored in capacitor 92 whenever the switch represented by modulator 25 is closed. That stored energy is discharged, at the difference frequency, into the storage circuit comprising coil 112 and capacitor 113, which is tuned to the 702 MHz carrier frequency. As a consequence, the modulation process is quite efficient. Indeed, energy is delivered to sideband selector 26 only over the passband of the 702 MHz input circuit.

In tuning system 40 (FIG. 3) the main phase-lock loop 20 operates on the basis of heterodyned sidebands in the output of sideband detector 26 that are near 702 MHz and which shift in exact correlation with the changes in frequency in oscillator 21. One construction that may be employed for side-band selector 26, in developing the single desired sideband signal, is shown in FIG. 7. In this construction, the sideband selector comprises a preselector circuit 121 tuned to 702 MHz, to which the broad spectrum signal (FIG. 6) from modulator 25 is applied. The output of preselector 121 is coupled to a first mixer 122 having an output connected to an intermediate frequency stage 123. The output of the IF amplifier 123 is connected to the input of a second mixer stage 124. A 336 MHz demodulation signal is supplied to each of the two mixers 122 and 124 from source 32 (FIGS. 2 and 3).

As with any feedback system, the main phase-lock loop 20 (FIG. 3) should include a single stage that cuts off at 6db per ocatve out to the point of unity gain before the other stages in the loop show any significant phase shift. That is, all stages in the loop, except one, should have a bandwidth at least equal to the product of loop gain and the ratio of the overall 3db bandwidth to the 3db bandwidth of the narrow band stage. Loop 20 ideally should pull-in and hold-in for ±3 MHz. The cutoff for low pass filter 24 may be smaller than 3 MHz by a factor of four. A frequency lock can be established in the loop when the difference frequency equals three or four times a low pass filter cutoff of about 1 MHz or less. A safe margin is assured if the bandwidth of loop 20 is approximately twenty times the low pass filter cutoff, in this instance about 20 MHz.

In sideband detector 26, FIG. 7, circuits 121 and 123 must have sufficient bandwidth to cover the range of offset frequencies used. Thus, the bandwidths of circuits 121 and 123 must be adequate for the offset reference frequency requirements set forth in Table I, at least 27 to 31 MHz. The corresponding input frequencies will be 699 MHz to 703 MHz and the frequencies in the IF stage 123 are 363 to 367 MHz.

The double superheterodyne detector 26 illustrated in FIG. 7 is advantageous because the 336 MHz demodulation signal frequency employed in the detector places the detector input close to the middle of the UHF oscillator range, thereby minimizing the number of sidebands required. Furthermore, the double superheterodyne frequency relationship placed the demodulation frequency outside of any received band. It may be necessary to trap the second harmonic of the 336 MHz demodulation frequency in detector 26; on the other hand, the selectivity in the input plus rejection through the balance modulator 25 (FIG. 8) may be sufficient to keep this second harmonic out of the television receiver circuits.

Figure 9:
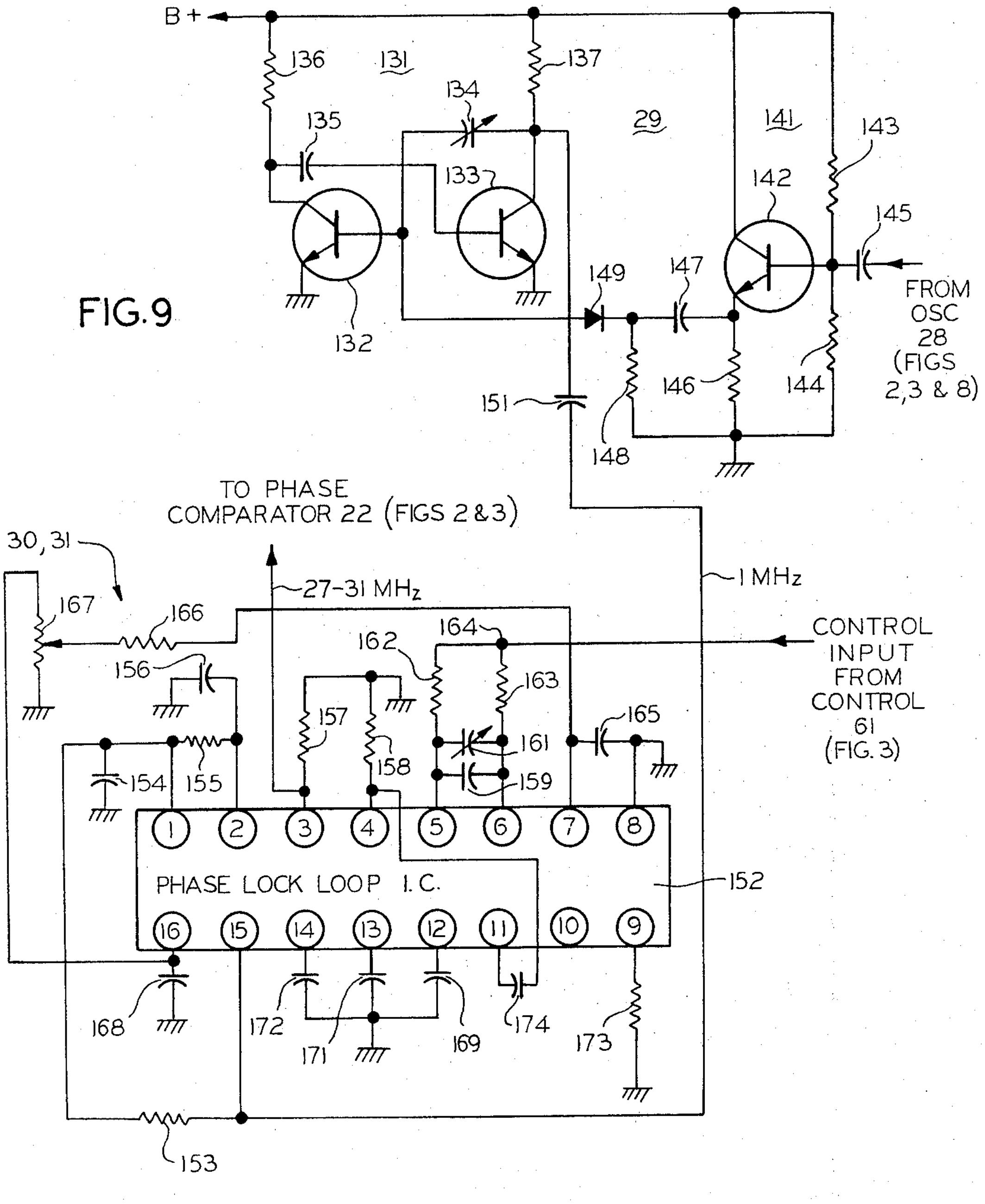
FIG. 9 comprises a circuit diagram of a frequency divider and reference signal generator incorporated in the tuning system of FIG. 3.

FIG. 9 illustrates operating circuits that may be employed for the offset reference signal generator means, comprising frequency divider 29, phase-lock loop 30, and bandpass filter 31, in generating the offset reference signal applied to phase comparator 22 (FIGS. 2 and 3). In the circuits shown in FIG. 9, frequency divider 29 comprises a multivibrator 131 including two transistors 132 and 133. The base of transistor 132 is connected to the collector of transistor 133 through an adjustable capacitor 134. The base of transistor 133 is connected to the collector of transistor 132 by a fixed capacitor 135. The emitters of the transistors 132 and 133 are both returned to system ground. The collector of transistor 132 is connected to the B+ supply through a resistor 136 and the collector of transistor 133 is connected to the B+ supply through a resistor 137.

Frequency divider 29 (FIG. 9) further comprises a circuit 141 for coupling multivibrator 131 to oscillator 28 and for locking the one MHz output from multivibrator 131 to the 6 MHz frequency of the output signal from oscillator 28. Circuit 141 comprises a transistor 142 having its collector connected to the B+ supply and having its base connected to B+ through a resistor 143. The base of transistor 142 is also connected to a resistor 144 that is returned to ground and is connected to a coupling capacitor 145 that is connected to an output terminal of oscillator 28.

The emitter of transistor 142 is connected to a load resistor 146 that is returned to system ground. A capacitor 147 is connected to the emitter of transistor 142 and to a diode 149 that is connected to the base of transistor 132 in multivibrator 131. The common terminal of diode 149 and capacitor 147 is connected to a resistor 148 that is returned to ground.

In the circuit of FIG. 9, the principal component for the circuits 30 and 31 is a commercial phase-lock loop integrated circuit 152, type 562B. The connection from multivibrator 131 in frequency divider 29 is provided by a coupling capacitor 151 that is connected from the collector of transistor 133 to terminal 15 of circuit 152. Terminal 15 of device 152 is also connected to a resistor 153 that is connected to terminal 1 of the integrated circuit and that is also bypassed to ground through a capacitor 154. Terminal 1 of circuit 152 is connected to terminal 2 through a resistor 155; terminal 2 is bypassed to ground through a capacitor 156.

Terminal 3 of integrated circuit 152 is utilized as the output terminal for the phase-lock loop and is connected to phase comparator 22 (FIGS. 2 and 3). Terminal 3 of device 152 is also connected to a resistor 157 that is returned to ground. Terminal 4 of the integrated circuit is connected to a resistor 158 that is returned to ground. Terminals 5 and 6 of integrated circuit 152 are interconnected by a fixed capacitor 159 paralleled with an adjustable capacitor 161. Terminal 5 of circuit 152 is connected to a resistor 162 and terminal 6 is connected to a resistor 163; resistors 162 and 163 are connected together at a terminal 164 constituting a control input terminal for connection to an offset control 61 (FIG. 3).

Terminal 8 of device 152 is connected to system ground. Terminal 7 is bypassed to ground through a capacitor 165 and is connected to a resistor 166 that is in turn connected to the tap on a potentiometer 167. One end of the resistance for potentiometer 167 is connected and the other end is connected to terminal 16 of device 152. Terminal 16 is also returned to ground through a capacitor 168. Terminals 12, 13 and 14 of device 152 are returned to ground through capacitors 169, 171 and 172, respectively. Terminal 9 of device 152 is connected to a resistor 173 that is returned to ground. Terminal 11 is coupled to terminal 4 by a small capacitor 172. Terminal 9 of device 152 is connected to a resistor 173 that is returned to ground. Terminal 11 is coupled to terminal 4 by a small capacitor 174. Terminal 10 of circuit 152 is left open-circuited.

In operation, multivibrator 131 is locked in phase to the standard 6 MHz frequency from oscillator 28, and furnishes harmonics of one MHz to the phase comparator incorporated in the phase-lock loop integrated circuit 152. The harmonics between 27 MHz and 32 MHz are emphasized by the coupling capacitor 151; in the illustrated circuit this is a two picofarad capacitor. The operating frequency of the oscillator incorporated in the phase-lock loop of device 152 is controlled by capacitors 159 and 161 and by a current supplied to control terminal 164. To avoid ambiguity in harmonic selection, the control current supplied to terminal 164, upon switching from one band to another, should always go to zero and should approach its final value from zero.

In order to afford a more complete illustration of the invention, specific circuit parameters for individual components of tuning system 40 as described above are set forth below. It should be understood that this information is presented solely by way of illustration and in no sense as a limitation on the invention.

| | Resistors |
|---|---|
| 74, 77 | 1.8 kilohms |
| 84 | 330 ohms |
| 85 | 680 ohms |
| 91, 146 | 560 ohms |
| 136 | 88 kilohms |
| 137 | 95 kilohms |
| 143 | 2.7 kilohms |
| 144 | 8.2 kilohms |
| 153 | 470 ohms |
| 155 | 1.8 kilohms |
| 157,158 | 1 kilohms |
| 162,163 | 39 kilohms |
| 166 | 27 kilohms |
| 148,167 | 10 kilohms |
| 86 | 5 kilohms |
| | **Capacitors** |
| 75, 87, 147, 156, 174 | 0.01 microfarad |
| 78 | 0.8 microfarad to 3 picofarad |
| 81 | 2.0 picofarad |
| 92 | 3.3 picofarad |
| 94 | 25 picofarad |
| 111 | 3.0 picofarad |
| 134 | 9–35 microfarad |
| 135 | 47 microfarad |
| 145 | 20 picofarad |
| 169, 171, 172 | 0.001 microfarad |
| 154 | .01 picofarad |
| 159 | |
| 161 | .01 picofarad |
| 165 | .01 picofarad |
| 168 | .01 picofarad |
| | **Semiconductor Devices, etc.** |
| 71, 72 | SE 5327E |
| 132, 133, 142 | SE 5025 |
| 83 | H.F. Schottky Barrier Diode |
| 149 | FD 100 |
| 152 | 562B |
| B+ | 15 volts |

Figure 10:
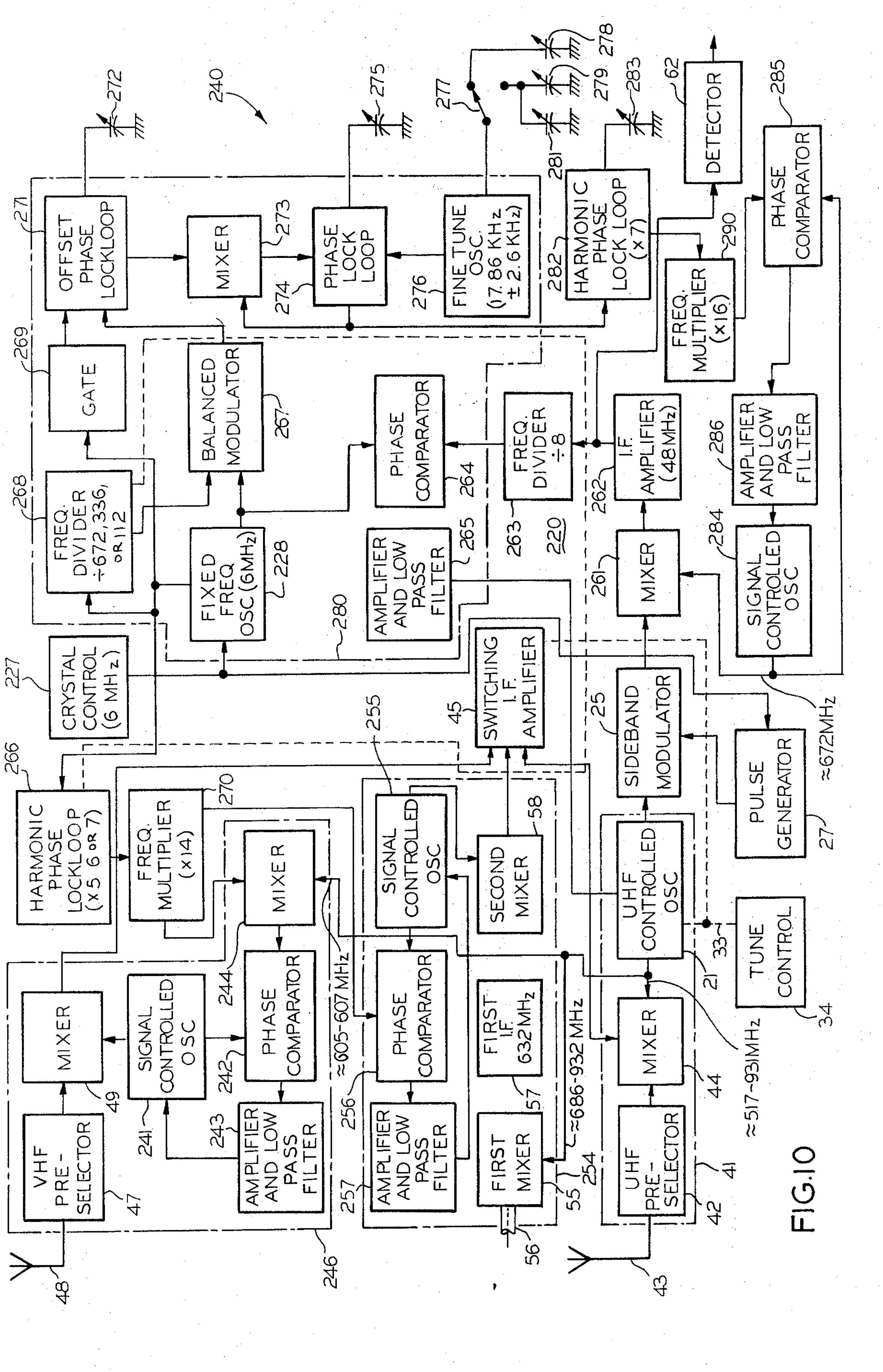
FIG. 10 illustrates a continuous tuning system for a television receiver constructed in accordance with another embodiment of the present invention.

FIG. 10 illustrates a television receiver tuning system 240 constructed in accordance with another embodiment of the present invention, but incorporating many of the features described above in connection with system 40 (FIG. 3). As in the previously-described system, tuning system 240 comprises a UHF signal-controlled oscillator 21 incorporated in a UHF tuner 41; tuner 41 includes a preselector 42 connected between an antenna 43 and a mixer 44. Mixer 44 receives its second input directly from oscillator 21 and has an output connected to a 44 MHz switching intermediate frequency stage 45.

Tuning system 240 (FIG. 10) further comprises a VHF tuner 246, which may correspond in construction to varactor-controlled tuners now in commercial use. Thus, VHF tuner 246 includes a preselector input stage 47 connected to a suitable VHF antenna 48. The output of preselector 47 is connected to a mixer 49. A second input to mixer 49 is derived from a local VHF signal-controlled oscillator 241. Oscillator 241 is incorporated in a phase-lock loop that includes a phase comparator 242 and an amplifier and lowpass filter circuit 243. The reference input to phase comparator 242 is derived from the output of a mixer 244 having one input connected to the output of oscillator 21 in UHF tuner 41.

The cable tuner 254 in system 240 includes a number of stages similar to those in tuner 54 of the previously described embodiment. Thus, tuner 254 includes a first mixer 55 having a cable input connection 56. A second input to mixer 55 is derived from the output of oscillator 21 in UHF tuner 41. The output of mixer 55 is coupled to the input of a first intermediate frequency stage 57 (632 MHz). The output of IF stage 57 is connected to one input of a second mixer 58. The output of mixer 58 is connected to the intermediate frequency amplifier 45.

The CATV tuner 254 of system 240 further comprises a phase-lock loop including a signal-controlling oscillator 255 having an output connection to a phase comparator 256. The output of phase comparator 256 is applied to an amplifier and low pass filter circuit 257 having a control feedback connection to oscillator 255. The output of oscillator 255 comprises the second input to mixer 58.

In system 240, the UHF oscillator 21 is incorporated in a main phase-lock loop 220 that includes a balanced sideband modulator 25 having one input connected to the output of oscillator 21 and a second input derived from a pulse generator 27. The output of modulator 25 is connected to one input of a mixer 261 having its output connected to a 48 MHz intermediate frequency amplifier 262. The output of IF amplifier 262 is connected to the input of a detector 62 that is not a part of loop 220, and to the input of a frequency divider 263 having a division factor of eight. The output of frequency divider 263 is connected to one input of a phase comparator 264. The output of phase comparator 264 is connected to the input of an amplifier and low pass filter circuit 265 having its output connected back to oscillator 21 to complete the main phase-lock loop 220.

Pulse generator 27 is a part of a pulse signal generator means that generates a pulse signal of precisely controlled standard frequency equal to the channel separation frequency of 6 MHz. Pulse generator 27 has an input connection from a crystal control circuit 227 that is also coupled to a fixed-frequency oscillator 228. Oscillator 228 develops an output signal of precisely controlled 6 MHz frequency that is coupled to phase comparator 264, affording the second input for the phase comparator in the main phase-lock loop 220.

The standard frequency reference signal output from oscillator 228 is applied to the input of a harmonic phase-lock loop 266 that can be switched to lock on the fifth, sixth, or seventh harmonic of the input signal. The output of phase-lock loop 266 is connected to a frequency multiplier 270 having a multiplication factor of fourteen. The output of frequency multiplier 270 is coupled to mixer 244 in VHF tuner 246. The output of multiplier 270 is also connected to the second input for the phase comparator 256 in cable tuner 254.

The output of the precision controlled 6 MHz oscillator 228 is also connected to the input of a frequency divider 268 and to one input of a balance modulator 267. Frequency divider 268 is a multiple ratio divider, having division factors of 672, 336, or 112. The output of frequency divider 268 is connected is connected to a second input for balanced modulator 267.

The output of oscillator 228 is also connected to one input of a gate circuit 269 having a second control input that actuates the gate to open condition only for one operating condition as described hereinafter. The output of gate 269 is connected to the input of an offset phase-lock loop circuit 271. The main input to phase-lock loop 271 is taken from the output of balanced modulator 267. Phase-lock loop 271 is provided with an external offset control comprising an adjustable capacitor 272.

The output of the offset phase-lock loop 271 is connected to the input of a mixer circuit 273. The output of mixer 273 is coupled to a phase-lock loop 274 employed for fine tuning and trimming purposes. An adjustable control capacitor 275 is connected to phase-lock loop 274. The output of phase-lock loop 274 is connected to the second input of mixer 273. A separate control input to phase-lock loop 274 is provided from a fine tuning oscillator 276 having an operating range of 17.86 KHz plus or minus 2.6 KHz. Oscillator 276 is connected, through a selector switch 277, to an adjustable capacitor 278 or to the parallel combination of a fixed capacitor 279 and an adjustable capacitor 281.

The output of phase-lock loop 274 is also connected to a control input for a harmonic phase-lock loop 282 that locks to the seventh harmonic of the input signal. Phase-lock loop 282 is provided with an external adjustment capacitor 283. The output of phase-lock loop 282 is connected to a frequency multiplier 290 (multiplication factor sixteen) which is in turn coupled to one input for a phase comparator 285. Phase comparator 285 is incorporated in a phase-lock loop with a signal-controlled oscillator 284, the output of oscillator 284 being supplied to a second input for comparator 285. This phase-lock loop further includes an amplifier and low pass filter circuit 286 having an input connected to the output of phase comparator 285 and having an output connected to the control impedance in oscillator 284. The output of oscillator 284 is also connected to mixer 261, affording the second input to the mixer.

In system 240 (FIG. 10), shaft 33, is again employed to control a number of switching functions. Thus, shaft 33 is coupled to amplifier 45 to switch the IF circuit between the three different inputs available from UHF mixer 44, VHF mixer 49, and CATV mixer 58. Shaft 33 is also coupled to phase-lock loop 256 to switch that circuit between the three multiplication factors required for low and medium VHF, high VHF and CATV reception. Further connections are provided from shaft 33 to frequency divider 268 and gate 269. Although mechanical connection are indicated from shaft 33 to each of the switch circuits 45, 266, 268 and 269, electrical coupling may be employed.

In tuning system 240, on UHF reception, UHF tuner 41 functions in the same manner as described above for system 40 (FIG. 2). That is, oscillator 21 supplies a beat signal directly to mixer 44 in tuner 41, the beat signal being adjusted in frequency by tuning oscillator 21 over a range of at least 517 MHz to 931 MHz in the course of a half-revolution of shaft 33. For UHF tuning during this first half-revolution of shaft 33, IF amplifier 45 is connected only to the input from mixer 44. Furthermore, the power supplies for VHF tuner 246 and CATV tuner 254 are disconnected, as by suitable switching apparatus (not shown) actuated from shaft 33.

A second half-revolution of tuning shaft 33 is again employed, in system 240, for both VHF and CATV reception. For low-band VHF reception, tuner 246 is energized and tuners 41 and 254 and disconnected from their power supplies. In tuner 246, the beat signal required for mixer 49 is generated in the local oscillator 241, incorporated in a phase-lock loop that includes phase comparator 242 and the amplifier and low pass filter unit 243. The reference input for phase comparator 242 is derived from mixer 244 and is controlled by adjustment of the frequency of the input to mixer 244 from UHF oscillator 21.

As a specific example, for channel two reception, phase-lock loop 256 is actuated, by its connection to tuning shaft 33, to lock on the sixth harmonic of the output signal supplied to that loop from the crystal-controlled oscillator 228. Thus, the output signal from loop 266 is at 36 MHz and the output signal from multipier 270 has a frequency of 504 MHz. For channel two reception, oscillator 21 is tuned to an output frequency of 605 MHz. The difference between the two inputs to mixer 244 is thus 101 MHz, the reference frequency required for the beat signal employed for channel reception (see Table II). For the upper end of the low and medium VHF bands, channel six, the operation is similar, again using the 504 MHz input to mixer 244 from multiplier 270, but with oscillator 21 tuned to 633 MHz. The difference frequency of 129 MHz is the reference frequency required for phase comparator 242 to maintain effective tuning control of oscillator 241 for channel six reception.

For high band VHF reception, the operation is the same except that the phase-lock loop 266 is switched to lock onto the fifth harmonic of the 6 MHz signal received from oscillator 228. As a consequence, the output signal to mixer 244, from frequency multiplier 270, is 420 MHz. Thus, for channel seven operation, oscillator 21 is tuned to a frequency of 641 MHz, producing a beat frequency of 221 MHz as required for a reference in phase comparator 242 in the control of oscillator 241 on channel seven reception. The 420 MHz output from loop 226 and multiplier 270 is utilized throughout the high band of the VHF range.

For operation in the cable reception band, again assumed to cover a range of frequencies from 54 MHz to 300 MHz, arbitrarily designated as channels 84 through 123 (Table II), phase-lock loop 266 is actuated to lock onto the seventh harmonic of the 6 MHz input from crystal-controlled oscillator 228. This produces an output signal at 42 MHz which is supplied to frequency multiplier 270, so that a reference signal of 588 MHz is continuously supplied to phase comparator 256 in cable tuner 254 for reception in the cable band. Comparator 256 is incorporated in a phase-lock loop with signal-controlled oscillator 255 and the amplifier and low pass filter unit 257. As can be seen by comparing tuner 254 (FIG. 10) with previously described tuner 54 (FIG. 3), tuner 254 operates in the same manner as described above for tuner 54 except that the input signal to second mixer 58 is derived from oscillator 255 instead of being developed directly from the 6 MHz crystal-controlled oscillator as in the previous system.

The major difference between tuning system 240 of FIG. 10 and the previously described system 40 (FIG. 3) lies in the operation of the main phase-locked loop 220 that incorporates the UHF controlled oscillator 21. In the main loop 220 of system 240, sideband modulator 25 functions in the manner described above to generate a broad-spectrum signal including multiple sidebands of the UHF demodulation signal from oscillator 21, the sidebands occurring at different integral multiples of a low-duty-cycle 6 MHz pulse signal supplied to modulator 25 from pulse generator 27, which are then heterodyned to 27±3 MHz. In loop 220, however, one selected sideband of this broad spectrum signal is heterodyned down to a frequency of approximately 48 MHz by an input signal from oscillator 284. The output of mixer 261 is applied to amplifier 262, which constitutes a part of the sideband selector in the main loop 220. The output of amplifier 262 is divided in frequency by a factor of eight, in circuit 263, producing an output signal of approximately 6 MHz. This signal is compared with the standard 6 MHz output from oscillator 228, in phase comparator 264. The output of comparator 264 is supplied to the amplifier and low pass filter unit 265 to develop a DC error signal that is applied to the signal-controlled UHF oscillator 21, thereby achieving a complete phase-locked loop. It is thus seen that loop 220 functions in much the same manner as loop 20 (FIG. 3), except that the phase comparison operation is carrier out at a level of 6 MHz instead of in the UHF frequency range as in loop 20.

The remaining circuits in system 240 (FIG. 10) are utilized to obtain the requisite offsets from integral multiples of 6 MHz for effective demodulation in the various reception bands (see Table I) and to provide for fine tuning and for compensation for a misaligned IF amplifier, in the television receiver, operating at a slightly non-standard frequency. These functions are carried out by controlling the output frequency of oscillator 284, which is incorporated in a local phase-lock loop comprising phase comparator 284 and the amplifier and low pass filter circuit 286. To the maximum extent possible, the offset and fine tuning functions are performed at 6 MHz in order to permit incorporation of these functions into an MOS chip, allowing utilization of existing function blocks in a control device of this nature. All of the circuits enclosed in outline 280 can be readily incorporated in MOS construction, along with suitable automatic channel selection controls if desired. The performance of these functions at the 6 MHz level also facilitates incorporation of tuning system 240 in a composite control allowing for actuation of the tuning system and a channel-identification display from logic circuits that can be incorporated in the same MOS chip. For such logic circuits, the input would be the binary coded digits for each selected channel, or a "select" signal reading preselected stored channel numbers into the logic in sequence.

To obtain the 1, 2 or 3 MHz offsets required for effective demodulation in the several reception bands (Table I), the 6 MHz output from crystal-controlled oscillator 228 is divided, in frequency divider 268, by a factor of 672, 336, or 112. Thus, the output signal frequency from circuit 268, for the three different required offsets, may be 8.95, 17.86 or 26.8 KHz. These signals are applied to modulator 267, together with the 6 MHz output signal from oscillator 228. Modulator 267 thus produces a 6 MHz signal, increased or decreased by an incremental frequency corresponding to the change required for an offset of one, two or three megahertz, that is supplied to the offset phase-lock loop circuit 271. The input to loop 271 may include a 6 MHz input from oscillator 228, depending on whether gate 269 is open or closed, the gate being actuated from tuning shaft 33.

Phase-lock loop 271 controls the offset frequency of tuning system 240. Loop 271 can be set to lock onto the carrier frequency (6MHz) input supplied thereto through gate 269. When a frequency offset is required, however, gate 269 is cut off, and the oscillator in loop 271 is allowed to drift up or down to the selected sideband, determined by the input to modulator 267 from frequency divider 268. Because divider 268 produces only one frequency at any given time, controlled by the position of tuning shaft 33, selection of a single offset can be effected in a positive manner.

Fine tuning is effected by the circuits comprising the fine tuning oscillator 276, phase-lock loop 274, and mixer 273. At its center frequency of 17.86 KHz, oscillator 276 is stable enough for standardization by means of a fixed capacitor circuit comprising capacitors 279 and 281. For manual fine tuning, switch 277 can be actuated to connect capacitor 278 to oscillator 276, allowing adjustment of the oscillator over the indicated range of plus or minus 2.6 KHz.

Phase-lock loop 274 generates an output signal of approximately 6 MHz that is supplied to mixer 273. A second input to mixer 273, from the offset phase-lock loop 271, develops an output signal that is supplied back to loop 274 as the reference input to the loop.

From the foregoing description, it will be apparent that the output signal from loop 274 has a frequency of approximately 6 MHz modified within a limited range by the modulation of the reference signal supplied to phase-lock loop 271 through modulator 267 and subject to further adjustment by the input to phase-lock loop 274 from the fine tuning oscillator 276. This offset and fine tuning adjustment signal of approximately 6 MHz is supplied to the harmonic phase-lock loop 282, which locks onto the seventh harmonic of the input signal and develops an output signal of approximately 42 MHz. The signal from loop 282 is multiplied in frequency by a factor of sixteen in circuit 290, affording an input signal of approximately 672 MHz to phase comparator 285. Thus, the input signal to phase comparator 285 has a frequency of approximately 672 MHz, varying from that frequency by limited amounts determined by the offset variation introduced through loop 271 and the fine tuning change introduced through loop 274. Oscillator 284 is maintained at the desired frequency of approximately 672 MHz, being incorporated in a phase-lock loop with circuits 286 and 285, and thus affords the requisite precision controlled input to mixer 261 for use with IF amplifier 262 for a center frequency of 720 MHz.

The sideband selector employed in system 240, comprising mixer 261, IF amplifier 262, frequency divider 263, and signalcontrolled oscillator 284, operates very much like a conventional UHF channel strip, in that it is a fixed-tuner 720 MHz receiver. It must afford adequate rejection of image frequencies and must reject the local oscillator frequency. Since detection of very low level sidebands is required, the gain in the sideband detector should be of the order of approximately 80 db or more. This gain is readily obtainable in the 48 MHz IF amplifier 262.

In tuning system 240, detector 62 produces a DC pulse each time the UHF oscillator 21 moves a sideband through the pass-band of the one-sideband detector comprising amplifier 262. These pulses can be counted to enable a logic circuit coupled to detector 62 (not shown) to count changes from a reference channel, in this instance channel 48. In this manner, an automatic logic control system can be afforded for actuation of the tuning control 34 that operates the main tuning shaft 33.

Figure 11:
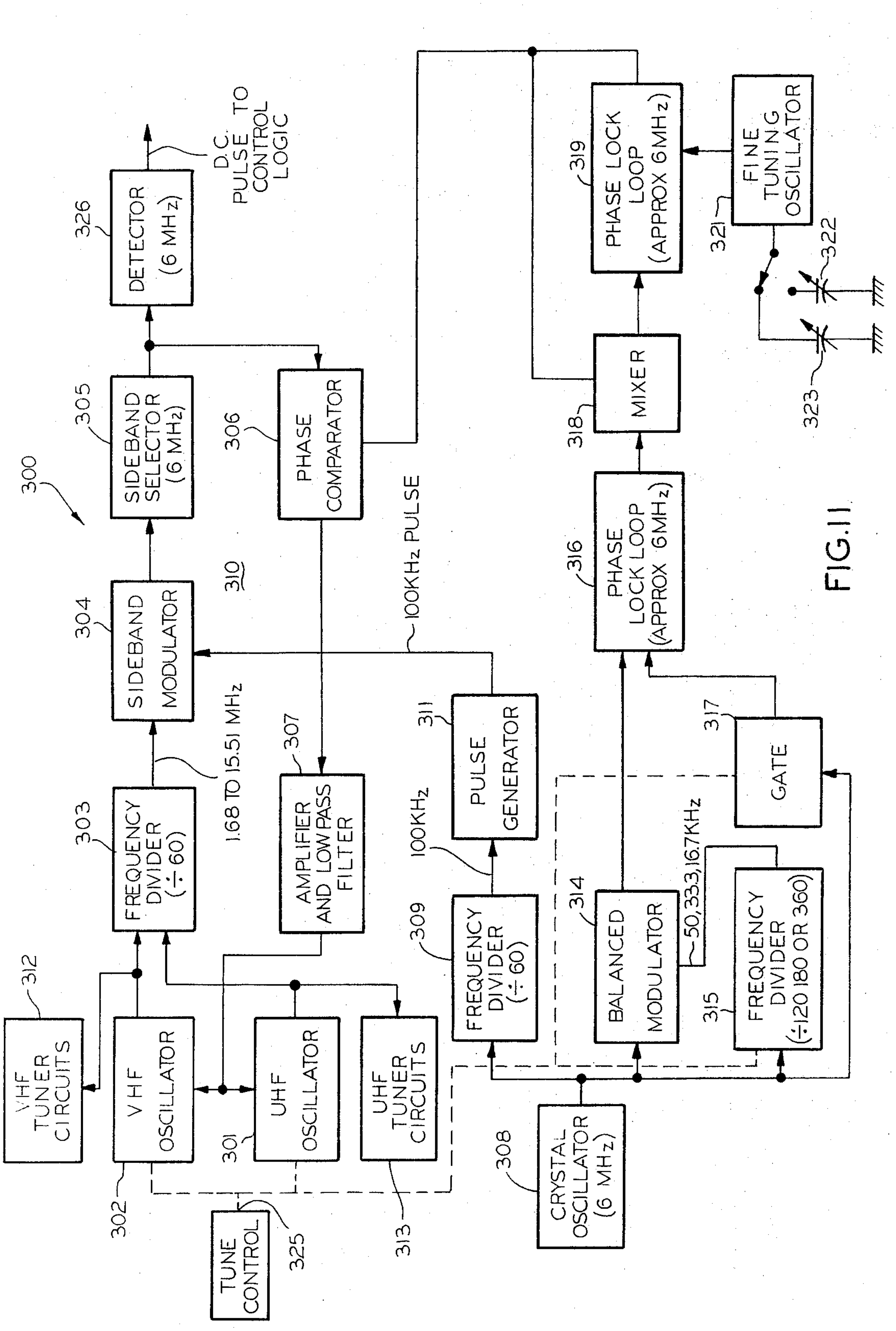
FIG. 11 illustrates a television receiver tuning system comprising a further embodiment of the invention.

FIG. 11 illustrates a tuning system 300 constructed in accordance with a further embodiment of the invention, which incorporates many of the features and advantages of the previously described systems. Tuning system 300 includes a signal-controlled UHF oscillator 301 having its output connected to UHF tuner circuits 313 which may be of conventional construction. System 300 further comprises a VHF oscillator 302, the output of this oscillator being coupled to a conventional VHF tuner circuit 312. The outputs of both of the oscillators 301 and 302 are coupled to the input of a frequency divider circuit 303 having a division factor of sixty.

The output of frequency divider 303 is coupled to one input of a sideband modulator 304 which may be similar in construction and operation to the modulator 25 described above. The output of modulator 304 is coupled to a sideband selector 305 and the output of selector 305 is connected to one input of a phase comparator 306. The output of phase comparator 306 is coupled to the input of an amplifier and low pass filter circuit 307. The output of circuit 307 is coupled to each of the two oscillators 301 and 302, thus completing a main phase-lock loop 310 for tuning system 300 that is generally similar in construction and operation to the main loops 20 and 220 described above.

Tuning system 300 (FIG. 11) further comprises a reference signal generator means for developing a reference signal of predetermined precisely controlled frequency. The reference signal generator means includes a crystal-controlled 6 MHz oscillator 308. The output of oscillator 308 is connected to a frequency divider 309 that has a division factor of sixty. The 100 KHz output from frequency divider 309 is coupled to the input of a pulse signal generator 311 that develops a pulse signal of precisely controlled standard frequency harmonically related to the 6 MHz channel separation frequency. In this instance, the pulse signal frequency is 100 KHz and the pulse width is approximately 100 nanoseconds. The pulse signal from generator 311 is applied to sideband modulator 304 in loop 310.

The output of oscillator 308 is also applied to one input of a balanced modulator 314. Modulator 314 has a second input derived from the output of a frequency divider 315 which can be operated at a division factor of 120, 180 or 360. The input to frequency divider 315 is taken from the output of oscillator 308. The output of modulator 314 is applied to the input of a phase-locked loop 316 operating at approximately 6 MHz. A second input to loop 316 is afforded through a gate 317 having an input from oscillator 308. The output of loop 316 is coupled to one input of a mixer 318. The output of mixer 318 is coupled to the reference input of a phase-locked loop 319 again operating at a frequency of approximately 6 MHz. The output of loop 319 is coupled back to a second input for mixer 318 and is also applied to the reference signal input of comparator 306 in loop 310. A second input to loop 319 may be derived from a fine tuning oscillator 321, the frequency of oscillator 321 being adjustable by means of either of two variable capacitors 322 and 323.

A single tuning shaft 325 is utilized for adjustment of the two oscillators 301 and 302, preferably adjusting oscillator 301 over a range of approximately one-half revolution of the shaft with the adjustment for VHF oscillator being effected over a smaller rotation of the shaft. A manual or motorized tuning control 324 is connected to shaft 325. Shaft 325 is also connected, mechanically or electrically, to frequency divider 315 and to gate 317 to actuate those circuits in accordance with tuning conditions in the operation of the system. A detector 326 may be coupled to the output of the one-sideband detector 305 to develop a DC pulse signal for application to an appropriate logic control system for actuating tuning control 324 in an automated system.

IN tuning system 300, oscillator 301 develops the beat signal necessary for effective demodulation of received UHF signals, and oscillator 302 serves the same purpose for VHF reception. Inasmuch as the tuner circuits 312 and 313 may be entirely conventional, no additional description of their operation is necessary.

The output signals from both oscillators 301 and 302 are supplied to frequency divider 303, producing output signals from divider 303 in a range of 1.68 MHz to 15.51 MHz, depending on which oscillator is in use and the frequency to which it is adjusted. The signal from the frequency divider counter 303 is applied to modulator 304 for modulation by the precisely controlled 100 KHz pulse signal from pulse generator 311, developing a broad spectrum signal including multiple sidebands of the signal from frequency divider 303 at different integral multiples of the standard pulse signal frequency, in this instance 100 KHz. Thus, the modulator output contains a multiplicity of sidebands which always extend to 6 MHz.

The sideband selector 305 is a simple 6 MHz tuned detector that develops a one-sideband output near 6 MHz and supplies that signal to the input of phase comparator 306. In comparator 306, the signal from detector 305 is compared with an input signal derived from the offset and fine tuning control circuits including phase-lock loop 319, as described more fully hereinafter. The output of phase comparator 306 is applied to amplifier and low pass filter circuit 307, which develops an error signal that locks the operative oscillator 301 or 302, to the appropriate signal for effective demodulation of either a single VHF or a single UHF channel.

The necessary offset of one, two or three MHz, at the operating frequency of either VHF oscillator 302 or UHF oscillator 301, is obtained at the 100 MHz level by dividing the output signal from oscillator 308, in circuit 315, by a factor of 120, 180 or 360. The output frequency of 50, 33.3 or 16.7 KHz from frequency divider 315 is selected, for any given part of the UHF or VHF range, by the coupling of frequency divider 315 to the main tuning member, shaft 325. In modulator 314, the signal from frequency divider 315 is modulated with the 6 MHz output from crystal oscillator 308 to produce a sideband spaced from the 6 MHz frequency by the appropriate amount to develop the requisite offset (1, 2 or 3 MHz) in the operation of oscillators 301 and 302. There is little or no 6 MHz output from modulator 314 unless it is fed to the output of the balanced modulator through gate circuit 317.

Phase-lock loop 316 develops a signal of approximately 6 MHz; if gate 317 is open, loop 316 locks onto the 6 MHz signal and the output frequency is exactly 6 MHz. For any required offset, on the other hand, the output signal from loop 316 is controlled by the sideband input from modulator 314, allowing the loop to lock onto any desired frequency to afford an offset of one, two or three MHz, plus or minus, in the operation of the tuning oscillators 301 and 302. Mixer 318, phase-lock loop 319, and fine tuning oscillator 321 function in the same manner as mixer 273, loop 274, and oscillator 276 in system 240 (FIG. 10) to further modify the 6 MHz signal by a limited amount, affording a means for fine tuning and allowing effective compensation for an IF stage in the television receiver that may be slightly misaligned with respect to the standard 44 MHz IF frequency. The output signal from loop 319 is supplied to phase comparator 306 as a reference signal, affording offset and fine tuning control for the main phase-locked loop 310 and thus for oscillators 301 and 302.

From the foregoing description, it will be apparent that each of the continuous tuning systems 40, 240 and 300 provides for continuous operation over a series of separate reception bands with all critical frequencies controlled from a single crystal-controlled source. In this regard, it will be apparent that system 300 can be readily modified to incorporate a cable tuner as well as the illustrated VHF and UHF tuners. In systems 40 and 240, all tuning for the different reception bands is effectively accomplished by adjustment of a single tunable oscillator. Thus, in each of these systems, complete tuning operation over all bands is effectively accomplished by adjustment of the frequency for the UHF oscillator.

In each system, the tuners for the three separate reception bands (VHF, UHF and cable) are completely separate, eliminating the numerous problems occasioned in systems incorporating a single input with associated antenna switching. In each of the systems, the cable tuner is independent of the VHF tuner so that there is no necessity for matching the characteristics of a single tuning device to the potentially quite diverse requirements of these two reception systems. In all of the described tuning systems, effective provision is made to compensate for misaligned IF stages, with no necessity for separate adjustment between the different reception bands. Furthermore, in each of the systems the cable tuner can be incorporated as an integral part of the overall system or can be treated as an optional addition to the system. The systems of the invention are particularly well adapted for utilization of varactor-tuner oscillators, effectively preserving the value of the extensive technological development previously accomplished with tuning devices of this kind.

I claim:

1. A continuous tuning system for a communication receiver operable over at least one reception band including a plurality of transmission channels, displaced from each other by a given channel separation frequency, comprising:

pulse signal generator means for generating a low duty cycle pulse signal of precisely controlled standard frequency, harmonically related to said channel separation frequency;

a main signal-controlled oscillator tunable over a broad frequency range, for generating a demodulation signal for control of demodulation of received signals;

a modulator, coupled to said oscillator and to said pulse signal generator, for modulating said demodulation signal with said pulse signal to develop a broad spectrum signal including multiple sidebands of said demodulation signal at many different integral multiples of said standard frequency;

selector means, coupled to said modulator, for deriving one selected sideband signal, within a given limited frequency span, from said broad spectrum signal;

reference signal generator means, for generating a reference signal of predetermined precisely controlled frequency within said given frequency span;

a phase comparator, coupled to said reference signal generator means and to said selector means, for developing an error signal representative of variations in frequency and phase between the selected sideband signal and said reference signal;

channel offset control means for adjusting the frequency of one of said reference signal and said selected sideband signal, within said given frequency span, to compensate for different offsets of the beat signals required for different transmission channels from integral multiples of said channel separation frequency;

and means to apply said error signal to said oscillator to complete a main phase-lock loop and lock said demodulation signal on a fixed frequency.

2. A continuous tuning system for a communication receiver, according to claim 1, and further comprising precision frequency determination means, comprising a crystal, coupled to said pulse signal generator means and to said reference signal generator means, to control the frequency of both said pulse signal and said reference signal.

3. A continuous tuning system for a communication receiver, according to claim 1, in which said channel offset control means comprises an offset control phase-lock loop and means for adjusting said offset control loop to lock the frequency of said one signal at any one of a series of fixed incremental levels within said given frequency span.

4. A continuous tuning system according to claim 3, wherein said communication receiver comprises a television receiver employed for reception of television signals with a channel separation frequency of 6 MHz and requiring offsets of 1, 2 or 3 MHz, plus or minus, for different reception bands, in which said offset control means is incorporated in said reference signal generator means to adjust the frequency of said reference signal, and in which said reference signal generator means comprises:

a 6 MHz crystal-controlled oscillator;

a frequency divider having a division factor of six, coupled to said oscillator, for developing a signal including multiple harmonics of one MHz;

and a bandpass filter, coupled to said frequency divider, for producing a signal including increments of up to five distinct integral multiples of one MHz within said given frequency span and for applying that signal to said offset control loop as a reference.

5. A continuous tuning system according to claim 3, wherein said communication receiver comprises a television receiver employed for reception of television signals with a channel separation frequency of 6 MHz and requiring offsets of 1, 2 or 3 MHz, plus or minus, for different reception bands, in which said selector means includes a mixer incorporated in said main phase-lock loop and a variable-frequency oscillator coupled to said mixer to apply a beat signal thereto, in which said offset control means adjusts the frequency of the selected sideband signal by varying the output frequency of said variable-frequency oscillator, and in which phase comparison, in said main loop, is effected at a frequency harmonically related to 6 MHz.

6. A continuous tuning system according to claim 5, in which said variable-frequency oscillator in incorporated in an auxiliary phase-lock loop and in which said offset control means comprises:

a 6 MHz crystal-controlled oscillator included in said reference signal generator means;

frequency divider means, coupled to said oscillator, for developing output signals at frequencies of 6 MHz divided by factors of 672, 336, or 112;

a balanced modulator, coupled to said oscillator and said frequency divider means, for developing an offset reference signal at a frequency of 6 MHz plus the output signal frequency of said frequency divider and for applying that offset reference frequency to said offset control loop to develop an intermediate signal of 6 MHz plus one of the output signal frequencies of said frequency divider;

and means, including a frequency multiplier, for applying said intermediate signal to said auxiliary loop for offset control.

7. A continuous tuning system according to claim 5, in which said offset control means further comprises fine tuning means for minor adjustment of the frequency of the television receiver IF signal to compensate for limited frequency variations in the carrier of a given channel and for any misalignment of the IF stages of the receiver.

8. A continuous tuning system according to claim 3, in which said main phase-lock loop includes a frequency divider interposed between said main oscillator and said modulator, and in which phase comparison is effected in said phase comparator at a frequency much lower than the operating frequency of said main oscillator.

9. A continuous tuning system for a communication receiver, according to claim 3, in which said communication receiver is a television receiver operable over low, medium, and high VHF reception bands and the UHF band, in which said channel separation frequency is 6 MHz, and in which said main oscillator is a UHF oscillator tunable over a range of approximately 230 MHz above and below a center frequency of approximately 720 MHz, said receiver further comprising VHF tuner means controlled by said demodulation signal.

10. A continuous tuning system according to claim 9, in which said VHF tuner means comprises a frequency multiplier, coupled to said reference signal generator means, for generating a signal in the UHF range at a high integral multiple of said reference signal frequency, and a mixer coupled to said frequency multiplier and to said UHF oscillator, for generating a beat signal for VHF band demodulation.

11. A continuous tuning system according to claim 9, said receiver further comprising CATV tuner means controlled by said demodulation signal, for reception of signals within a CATV band in the VHF frequency range. p

12. A continuous tuning system according to claim 11, in which said CATV tuner means comprises:

a first mixer, coupled to said main oscillator, employing said demodulation signal to heterodyne a received CATV signal up to an initial intermediate frequency over twice the highest received CATV frequency;

a frequency multiplier, coupled to said reference signal generator means, for generating a second demodulation signal at a high fixed multiple of said reference signal frequency, displaced from said initial intermediate frequency by 44 MHz;

and a second mixer, coupled to said first mixer and to said frequency multiplier, for developing a second intermediate frequency signal at 44 MHz.

13. A continuous tuning system according to claim 11, in which all-band reception is effected by a single main tuning shaft actuating said main oscillator, UHF tuning being accomplished over a given integral number of half-revolutions of said shaft, and VHF and CATV tuning being accomplished over a corresponding number of half-revolutions of said shaft, the total tuning frequency range of said main oscillator being approximately the same for UHF tuning as for both VHF and CATV tuning.

14. A continuous tuning system for a communication receiver, according to claim 1, and further comprising a detector, coupled to said main phase-lock loop, for detecting movement of the error signal amplitude in said main loop through a zero level indicative of a precise lock on a given reception channel frequency to develop an externally usable precision lock signal.

15. A continuous tuning system for a communication receiver, according to claim 1, in which said modulator comprises a double balanced hot carrier diode bridge fed by an inductive loop, excited at high amplitude with said demodulation signal by inductive coupling to the inductive loop and excited at low amplitude with said pulse signal.

16. A continuous tuning system for a communication receiver, according to claim 15, in which the duty cycle of said pulse signal is of the order of two percent.

17. A continuous tuning system according to claim 1, wherein said communication receiver comprises a television receiver operating over VHF, UHF and CATV reception bands and in which said main oscillator comprises the demodulation oscillator for all of said bands.

18. A continuous tuning system according to claim 17, in which said main oscillator is a UHF oscillator and said demodulation signal is employed directly in demodulation of UHF band signals, and in which said demodulation signal is mixed with multiples of said pulse signal for demodulation of said VHF and CATV bands.

19. A continuous tuning system for a communication receiver, according to claim 1, and further comprising frequency divider means, interposed in said main phase-lock loop between said selector means and said phase comparator, to reduce the bandwidth requirements of said phase comparator and said reference signal generator means.

20. A high-frequency phase-lock loop, operable in the UHF frequency range, for operation on any one of a multiplicity of integral multiples of a standard frequency, comprising:

pulse signal generator means for generating a low duty cycle pulse signal of precisely controlled standard frequency:

a signal-controlled oscillator, tunable over a broad frequency range, for generating a high-frequency signal, much higher in frequency than said standard frequency;

a modulator, coupled to said oscillator and to said pulse signal generator, for modulating said high frequency signal with said pulse signal to develop a broad spectrum signal including multiple sidebands of said high-frequency signal at different integral multiples of said standard frequency;

selector means, coupled to said modulator, for deriving one selected sideband signal, within a given limited frequency span, from said broad spectrum signal;

reference signal generator means, for generating a reference signal of predetermined precisely controlled frequency:

a phase comparator, coupled to said reference signal generator means and to said selector means, for developing an error signal representative of variations in frequency and phase between the selected sideband signal and said reference signal;

frequency divider means, interposed in said loop between said oscillator and said phase comparator, for reducing the bandwidth requirements of said loop;

and means to apply said error signal to said oscillator to complete a phase-lock loop and lock said high-frequency signal on a fixed frequency.

21. A high-frequency phase-lock loop, according to claim 20, in which said modulator comprises a double balanced inductive loop hot carrier diode bridge, excited at high amplitude with said demodulation signal by inductive coupling to the inductive loop and excited at low amplitude with said pulse signal, and in which the duty cycle of said pulse signal is of the order of two percent.

* * * * *